(12) United States Patent
Azevedo et al.

(10) Patent No.: US 9,819,410 B1
(45) Date of Patent: Nov. 14, 2017

(54) SUPER SPEED SATELLITE SYSTEM (S4)

(71) Applicant: QB Technology Partners, LLC, Niwot, CO (US)

(72) Inventors: Celso Azevedo, Niwot, CO (US); George Sarkis, Onnda, CA (US)

(73) Assignee: QB TECHNOLOGY PARTNERS, LLC, Niwot, CO (US)

( * ) Notice: Subject to any disclaimer, the term of this patent is extended or adjusted under 35 U.S.C. 154(b) by 0 days.

(21) Appl. No.: 15/485,524

(22) Filed: Apr. 13, 2017

(51) Int. Cl.
   *H04B 7/185* (2006.01)
   *H04L 27/34* (2006.01)
   *H04L 29/06* (2006.01)

(52) U.S. Cl.
   CPC ......... *H04B 7/18515* (2013.01); *H04L 27/34* (2013.01); *H04L 65/608* (2013.01)

(58) Field of Classification Search
   None
   See application file for complete search history.

(56) References Cited

U.S. PATENT DOCUMENTS

| | | | |
|---|---|---|---|
| 4,355,411 A * | 10/1982 | Reudink | H04B 7/2621 455/437 |
| 5,729,526 A * | 3/1998 | Yoshida | H04L 1/007 370/206 |
| 6,058,307 A | 5/2000 | Garner | |
| 6,070,070 A | 5/2000 | Ladue | |
| 6,078,810 A | 6/2000 | Olds et al. | |
| 6,185,409 B1 | 2/2001 | Threadgill et al. | |
| 6,278,861 B1 | 8/2001 | Ward et al. | |
| 6,477,370 B1 | 11/2002 | Sigler et al. | |
| 6,760,788 B2 | 7/2004 | Knight | |
| 7,020,708 B2 | 3/2006 | Nelson et al. | |
| 8,140,611 B1 * | 3/2012 | Miller | H04L 67/02 709/201 |
| 8,787,246 B2 | 7/2014 | Brownrigg | |
| 8,982,856 B2 | 3/2015 | Brownrigg | |
| 2008/0181108 A1 | 7/2008 | Hashmi et al. | |
| 2012/0058775 A1 | 3/2012 | Dupray | |

* cited by examiner

*Primary Examiner* — Mohammed Rachedine
(74) *Attorney, Agent, or Firm* — Dennis F. Armijo

(57) ABSTRACT

System, method and application integrates secure, seamless and global telecommunications satellite system network with certain radiocommunications services providing two physically separate and electronically discrete wireless radio frequency (RF) broadband networks delivering terabit/sec data transfer rates per each satellite and combines redundant terrestrial fiber private networks to address atmospheric attenuation and system failures. The super speed satellite system (S4) with separate discreet network connectivity for both performance data and Internet signals resides on virtual cloud platform to support multiple mobile connectivity applications to access, monitor, track and relay RF multimedia signal transmissions in two modes: download or streaming enabling real time virtual "black box" signal transmissions of approximately 9.5 terabits/sec per satellite to/from any latitude or longitude between aircraft, and authorized S4 ground network operating centers (NOC). S4 telecommunication system includes phased array and synthetic aperture technologies to plot top-down virtual representation of objects moving through pre-defined airspace.

23 Claims, 11 Drawing Sheets

SUPER SPEED SATELLITE SYSTEM (S4)

BACKGROUND OF THE INVENTION

Field of the Invention (Technical Field)

The presently claimed invention relates to an integrated interoperable global and seamless telecommunications satellite and terrestrial system to provide super high speed for multiple mobile applications available anytime and everywhere on a worldwide basis. The concept of Super Speed Satellite System (S4) can provide super high speed for mobile services with aeronautical, maritime and land vehicles. This application refers specifically to aeronautical applications of the concept of S4.

Background Art

Current air traffic control systems do not provide uninterrupted wireless RF communications capabilities in HF and VHF frequency bands and provide extremely low speed satellite communications which are not seamless and do not extend throughout all International Telecommunications Union (ITU) designated geographical Regions R1 (Europe, Africa, Middle East), R2 (The Americas), and R3 (Asia and Oceania). Said HF, VHF and satellite narrow bandwidth, and low signal transmission rates are based on decades-old technologies and limit simultaneous transmission of aircraft avionics performance data, voice, navigation, position reports, and audio video (a/v).

There are two categories of airspace classification: regulatory and non-regulatory. Within these two categories, there are four types of airspace: controlled, uncontrolled, special use airspace, and other (non-controlled) airspace. Further, controlled airspace is segmented into classes A, B, C, D, and E. Classes A through E have three general attributes: an operational control tower with airspace that is segmented from an altitude above an airport's elevation, up to 60,000 feet, or in adjacent controlled airspace. Non-controlled airspace is classified as class G airspace.

Limitations of physics create gaps and blind spots in wireless RF signal communications and radar coverage in non-controlled airspace over oceans, in remote or undeveloped areas on all continents. Said gaps and blind spots are compensated with best practices safety procedures and protocols such as switching from positive air traffic control to en-route control or to procedural control.

Due to the earth's curvature and limitation of line-of-sight, HF and VHF radio communications signal propagation is distance-limited over oceans or sparsely populated areas. Hence, positive ground control radar to monitor or track aircraft to traverse gaps and blind spots over oceans and in remote or undeveloped areas on all continents is not feasible. As a practical matter, Air Traffic Control (ATC) has no authority or responsibility over class G non-controlled airspace, as ATC lacks the communications and tracking capabilities to do this. The alternative in non-controlled airspace is procedural control, e.g., time based position reporting. Alternatively, on-board devices such as Automatic Dependent Surveillance—Broadcast (ADS—B Out) have been used, however, ADS—B Out can be turned-off by the aircrew, and can only provide low data transfer rates. In addition, ADS—B Out messages can be spoofed, as they are not encrypted nor are they authenticated.

In non-controlled airspace, the shortcoming of procedural control occurs on intersecting routes where aircraft safety is compensated for with best safety practices, procedures, and protocols, such as maintaining minimal vertical and/or horizontal separation. However, if one aircraft has to change altitude or heading, that change may result in a separation conflict with other aircraft(s). Said conflict(s) must be resolved prior to approving a change in the flight path to maintain safe minimum separation. These changes are currently made via a satellite relay to send and receive SMS text messages between/among the source and the destination Although improvements and upgrades in legacy technologies continue to occur, they occur on a piecemeal basis, as evidenced by increasing reports of aircraft incidents, accidents, and lost aircraft. Research and development is expensive as is the implementation to make incremental upgrades. Many upgrades are retro-upgrades that continue to support the legacy ARINC 429 bus standard, which pre-dated the release of low cost integrated circuits by solid state component manufacturers.

The aviation industry continues to rely on the legacy ARINC 429 data transfer bus standard that was last updated with Williamsburg Protocol in the late 1980s. The ARINC 429 bus standard is a simplex serial one-way signal path to make piecemeal improvements and upgrades. These upgrades are not comparable with the performance capabilities of current generation of digital avionics being installed in aircraft with simplex serial data transfer bus.

For example, data transfer and processing of Airbus 310 requires approximately 150 separate buses interconnecting computers, radios, displays, flight controls, and sensors. A narrow bus (pipe) restricts the flow of data transfer and processing. To minimize error, the clock speed of the microprocessor is slowed down. In addition, with 150 separate busses, the issue of how to process the output of 150 separate instruction file sets was part of software programming wars going back to the 1960s. The issues are described as, what is the file handling protocol, e.g., what gets processed first in order to open the file to be processed, and what files to lock until the file being processed is executed. Typically, this was resolved by First-In First-Out (FIFO) queue data structure, which is a sequential file buffer. Legacy HF, VHF, and UHF narrow band communications systems and devices cannot be optimized to create safe and efficient integrated communications between/among aircraft with authorized ground communications centers and vice versa.

These shortcomings are particularly true since the cockpit has been digitized and is commonly known as the "glass cockpit." This refers to the replacement of analog instruments with digital instruments whose dials and displays report the output of sensors processed by on-board flight management computers, telecommunications, as an integrated and interoperable system, which in turn requires more bandwidth and faster data transfer rates that will support machine-to-machine communication speeds.

The shortcomings of reliance on legacy formats with slow data transfer rates lead to communication breakdown, which has been obvious in accident events when the physical on-board recorders, such as Flight Data Recorders (FDR), cockpit Voice Data Recorder (VDR), or Quick Access Recorder (QAR) collectively known as "black boxes", are damaged or lost as occurred in recent air disasters such as Air France Flight 447, Malaysia Flight MH370, AirAsia Flight 8501, and Egypt Air Flight 804.

Whether aircraft are or are not tracked by radar, aircraft accident investigation teams follow the procedure of first locating the downed aircraft in order to recover the on-board black boxes to reconstruct the cause of the accident, i.e., was the cause pilot error or was it due to aircraft equipment failure or weather related? The reconstruction procedure is dependent on physically recovering both on-board electronic devices known as "black boxes", i.e., Flight Data Recorder (FDR) and the cockpit Voice Data Recorder (VDR). If the downed aircraft is not located or one or both of these on-board black boxes is damaged, delayed in being found or cannot be recovered, the investigation may be delayed, inconclusive or thwarted.

The current generation of jet aircraft is technically very complex. For example, in 1988, the Airbus 320 entered commercial passenger service. The A320 had a revolutionary digital fly-by wire flight control system. Essentially, the pilot flies the aircraft computers, which are programmed to help automate aircraft stability to prevent unsafe operations outside of the aircraft certified air worthiness flight performance envelope. These sophisticated jet aircraft have replaced traditional cockpit analog instruments with digital instruments. The instrumentation is driven by computer flight management systems (hardware & software), which incorporate multiple sensor modules, whose signal interactions are compared to compute, coordinate and make changes in the engines and flight control surfaces. In addition, all of these computations and system changes are stored in memory, typically in Flight Data Acquisition Unit(s) (FDAU), which is part of the Right Management Systems (FMS).

All of the FDAU digital signals and cockpit audio are also captured and saved in on-board black boxes (FDR, VDR or QAR), which, in accidents, must be found and recovered to reconstruct the reasons that lead to crashes. However, current aviation communications systems continue to be rooted in the past. They lack robust telecommunications bandwidth and adequate data transfer rate connectivity links to stream all aircraft data/information/messages, plus cockpit audio and multiplexed audio-video in real time, to authorized ground Network Operation Centers (NOC) in order to create a virtual black box.

Communication satellites relay electromagnetic wireless RF signals from the source to its destination. In some instances, the source is fixed or can be mobile, in other instances, the destination is mobile or can be fixed. In some instances, both the source and the destination are mobile or both are fixed. Moreover, the wireless RF signal may be transmitted from a mobile or a fixed source to be relayed to a fixed or mobile destination or any combinations thereof.

Some of the prior art Gamer 6,058,307; Threadgill 6,185,409; Ward 6,278,861 and Sigler 6,477,370 teach dial-tone access to terrestrial dial-up connectivity to complex circuit-switched integrated Services Digital Networks (ISDN) communication systems. These systems include engineered network hubs and gateways, network control centers, network operation controllers, central controllers, mobile earth terminals to allocate communications resources to control mobile services to switch, route, direct, provide access and transmission links for wireless radio frequency signals between and among satellites and terrestrial Plain Old Telephone System (POTS) networks, which include wired and/or wireless networks such as Public Switched Telephone Network (PTSN), Private Networks (PN), Public Switched Data Networks (PSDN), Cellular Networks (CN), and Personal Communications Service (PCS) or combinations thereof. Dial-tone access to dial-up connectivity with complex circuit-switched communications network systems are taught in these references. The patents facilitate access and connectivity with terrestrial communications networks via mobile satellite services with mobile communication networks and roaming between the mobile satellite system and terrestrial based circuit-switched dial-up communications hubs or gateways and user devices. The universal shortcomings of dial-tone access for dial-up connectivity to circuit-switched ISDN terrestrial network hub and gateway connections often involve routing and re-routing signals through several terrestrial networks with different protocols. These interconnections and handoffs complicate the flow of the information signals and slow the flow down. The throughput flow of information (voice and data) is only as fast as the slowest link in the circuit-switched terrestrial telephone networks. Dial-tone access has proven to be highly susceptible to "hacking" of public dial-up communications networks. These patents were already dated and then obsoleted when access to Internet TCP/IP protocol was made available to public end users with browser enabled devices that could directly connect to commercial Internet Service Providers (ISP) for a fee.

U.S. Pat. No. 6,078,810 to Olds teaches a method and apparatus for efficiently combining global broadcast services with local broadcast services comprising a two-tier satellite system, which includes a geostationary (GEO) satellite tier and a low earth orbit (LEO) satellite tier. Olds also teaches alternative embodiments of 2 and 3 tier constellations, which are more complicated than the 2 tier satellite constellation.

U.S. Pat. No. 6,070,070 to Ladue teaches a wireless cellular Personal Communications Systems (PCS), Mobile Satellites (MS), and Low Earth Orbit (LEO), Medium Earth Orbit (MEO), High Earth Orbit (HEO), Ellipsoid Satellites (ES) and Geosynchronous Networks (GN). Specifically, the invention relates to enabling remote control of switching functions and ground station functions. The invention relates to and utilizes standard signaling System Seven (SS7) networks and Internet networks. Ladue does not acknowledge that Mobile Satellite Services (MSS) relayed by satellite from its source to its destination are divided into three major categories that depend on where its destination is located, e.g., Maritime Mobile Satellite Service (MMSS), Aeronautical Mobile Satellite Service (AMSS), and Land Mobile Satellite Service (LMSS). Mobile Satellite Services (MSS) are primarily intended to relay telephone calls and low speed digital services such as telex, fax, and low bit rate transfers.

U.S. Pat. No. 7,020,708 to Nelson, et al., and U.S. Pat. No. 6,760,788 to Knight, disclose other attempts to provide data communications systems. The '708 patent describes providing data communications services by co-locating a dedicated data communications server on aircraft to establish a wireless radio communications path via a satellite to accommodate passenger connection to public ground networks. The '708 patent teaches the data communications system architecture is segmented into three parts, the aircraft data server, the cabin distribution system and the bearer system server components that can provide the server with a plurality of ground based servers which include a plurality of interface units for interconnections to various public networks. The '708 co-located dedicated hardware/software open communication system for aircraft dismisses the present on-board closed non-public data communications system for passengers which imposes disadvantages such as high cost, inconvenience and inefficiency when it is possible to make use of public communications systems. The '708 patent obviates that present on-board closed non-public communications systems are designed to insure safety of aircraft and passengers rather than subordinating safety to accommodate affordable passenger amenities.

U.S. Pat. No. 8,787,246 and U.S. Pat. No. 8,982,856, both to Brownrigg, teach that a wireless network system may include a source node, wherein the source node initiates a data transmission and a wireless network system that may also include a repeater node, wherein such repeater is configured to receive the data transmission, and repeat the data transmission. The wireless network system also includes a destination node, wherein the destination node is configured to receive the data transmission. A wireless network system may also include a satellite-based, wireless network system, including an earth station server, a satellite client, and a terrestrial client. These patents describe the use of Wide Area Network (WAN) that was designed to remain operational even in the event of a catastrophic loss of a large portion of the network. To accomplish this goal, robust protocols and systems were developed that allowed a geographically distributed collection of computer systems to be connected by means of a network that would remain operational, even if a large portion of the network was destroyed.

U.S. Provisional Patent Application 60/828,548 to Hashmi teaches dynamic link rate adjustment of data packets between the source and the destination. Hashmi teaches a number of steps, techniques and procedures to throttle (regulate and adjust) the data throughput packet rate to efficiently manage the Available Bit Rate (ABR) that can adapt to bandwidth that varies with time, with signal noise and TCP window size.

SUMMARY OF THE INVENTION

Disclosure of the Invention

The presently claimed invention overcomes the shortcomings of the prior art references by providing a method, system, product and a service which resides on a virtual cloud platform whose wireless EHF and SHF Radio Frequency spectrum (RF) provides access and Uplink (UL) and Downlink (DL) connectivity with the telecommunications satellite network from aircraft at any latitude or longitude in the air space surrounding the earth to any latitude or longitude on the earth's surface at any time. It is a fully global and seamless system.

S4 is an aviation application that provides seamless and global real time interactive EHF and SHF broadband high speed data signal transfer rates among three objects in continuous motion. These objects are aircraft, satellites, and the earth. RF signal latency occurs among aircraft, satellites, and the earth in continuous motion and in some cases, must be minimized. More particularly, S4 capabilities are apparent in emergencies where aircraft must be able to stream real time multimedia data signals to authorized ground stations from any latitude and longitude, thus creating a "virtual black box". Additionally, S4 satellites can be enabled with phased array and synthetic aperture radar electronic tracking capability to stream scanned image signals, plotting a three-dimensional top down visualization, synchronized with the flight path of the aircraft in streaming mode to the authorized S4 NOC "virtual back box." The S4 "virtual black box" is not dependent on locating and retrieving physical boxes installed on each aircraft. The goal of creating a "virtual black box" is not currently possible in existing communications satellite systems or in communications systems proposed for launch into orbit for aeronautical applications.

The electromagnetic radio frequency spectrum allocated by the International Telecommunications Union (ITU) into frequency bands ranges from 3 kilohertz (kHz) to 300 Gigahertz (GHz). Wireless radio frequency (RF) is a finite resource whose international usage is managed by the ITU and shared among member nations.

Radio frequency bands have inherent limitations, particularly those in the HF and VHF bands, where due to their narrow bandwidth and propagation effects, only low data transfer rates can be transmitted. Legacy radio communication devices continue to require aircraft to be equipped with multiple types of communications devices for different communications signal formats. For example, when aircraft enter or exit controlled or non-controlled airspace, currently there is the need to change VHF frequency settings to local VHF control frequencies. In contrast, EHF and SHF frequencies selected for S4 are allocated on a seamless and global basis, so they do not need to be changed when the aircraft enters of exits a controlled or non-controlled airspace.

Wireless digital communications technology requires broadband high speed capabilities to process, synchronize and simultaneously transmit and receive signals of more than one wave form, e.g., audio, data, video, and voice, commonly called "multimedia". The term "broadband" commonly refers to access to reliable EHF and SHF (wideband) wireless radio frequency bands allowing high speed data signal transfer rates and connectivity between a source of the radio frequency (RF) signal and the destination of the RF signal.

A gradual migration from narrow band to broadband access and connectivity has occurred in the Ultra High Frequency (UHF) band range (300 MHz-3 GHz) and with satellite systems operating in the Super High Frequency Band (SHF) range (3 GHz-30 GHz. Although improved over HF, VHF and UHF wireless systems, the use of SHF spectrum band is becoming congested and lacks the data transfer speed of wireless EHF frequency bands.

The ITU administers and manages the international availability of wireless RF band spectrum and satellite services in R1, R2, and R3 by the allocation of frequency bands to terrestrial and satellite services in those specific geographic regions. By providing the regulatory framework, the ITU enables the use and sharing of such frequency band spectrum by different services and systems, particularly in the case of satellite services, where their coverage normally spills beyond the geographic boundaries of countries and regions (spill-over).

As defined in S4, "telecommunications" refers to access to and connectivity with a digital signal broadband satellite network, capable of high speed data transfer rates, versus narrow band slow or low speed data transfer rates available in current systems, particularly those which still rely on HF and VHF legacy technologies.

S4 preferred frequency spectrum occurs in the Extremely High Frequency (EHF) range (30 GHz to 300 GHz) and Super High Frequency (SHF) range (3 GHz to 30 GHz). The S4 high speed satellite telecommunications network can support multiple applications that are seamless and global and can be applied to radio, television, Internet, satellite phones, mobile smartphones, Internet Service Providers (ISP), microwave backbone and backhaul services, surveillance, shipping, trucking, aviation, and navigation aids, including maritime and land mobile.

The example described herein focuses primarily on S4 as a mobile application in the field of aviation, to overcome bandwidth and distance limitations that occur particularly in the HF and VHF frequency bands. The satellite telecommunications network relays RF signals among aircraft(s), satellites, and authorized ground stations which both transmit and receive broadband frequencies within the EHF and SHF spectrum bands, and which are allocated on a global and seamless basis. This application also provides separate access and separate two-way super high speed connectivity between Internet Service Providers (ISP) and passengers on aircraft. The wireless Internet access and connectivity is physically separate, electronically isolated, and on discrete frequencies as those used for avionics and navigation applications.

The presently claimed invention draws on recent technology advancements from many fields including satellites, wireless radio communications, digital access and connectivity, integrated circuitry, interactive broadband services, cloud based computer platform with a common software network interface, and ISP Services. The aviation application exemplified herein will describe an innovative telecommunication satellite network system in the EHF and SHF frequency spectrum bands, to provide simultaneous safe, reliable and separate access and connectivity for discrete in-flight passenger service, and separate simultaneous dynamic avionics-navigation performance data transmitted and received as digitized multiplex signals, in dual modes (downloaded or streamed), seamlessly and globally, to and from all latitudes and longitudes of the globe at any time.

The presently claimed invention creates a virtual worldwide satellite and terrestrial digital telecommunications network platform. S4 EHF and SHF satellite telecommunications technology identifies the infrastructure building blocks to establish wireless seamless global, on-demand access for satellite connectivity with a virtual cloud computing network platform. In the digital age, wireless multimedia data wave formats can be processed into information signals, as dynamic content. Telecommunications key actions are the capability to process, synchronize and simultaneously transmit wireless multimedia data signals in real time, e.g., to create a "virtual black box" of dynamic content of an aircraft performance data from engine start to engine shut down. Particularly in emergencies that depend on locating and physically recovering the Flight Data Recorder (FDR) and Voice Data Recorder (VDR) storage devices (conventional "black boxes") to determine if the problem was pilot error, aircraft failure or weather related.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention. In the drawings:

DESCRIPTION OF THE PREFERRED EMBODIMENTS

Figure 1:
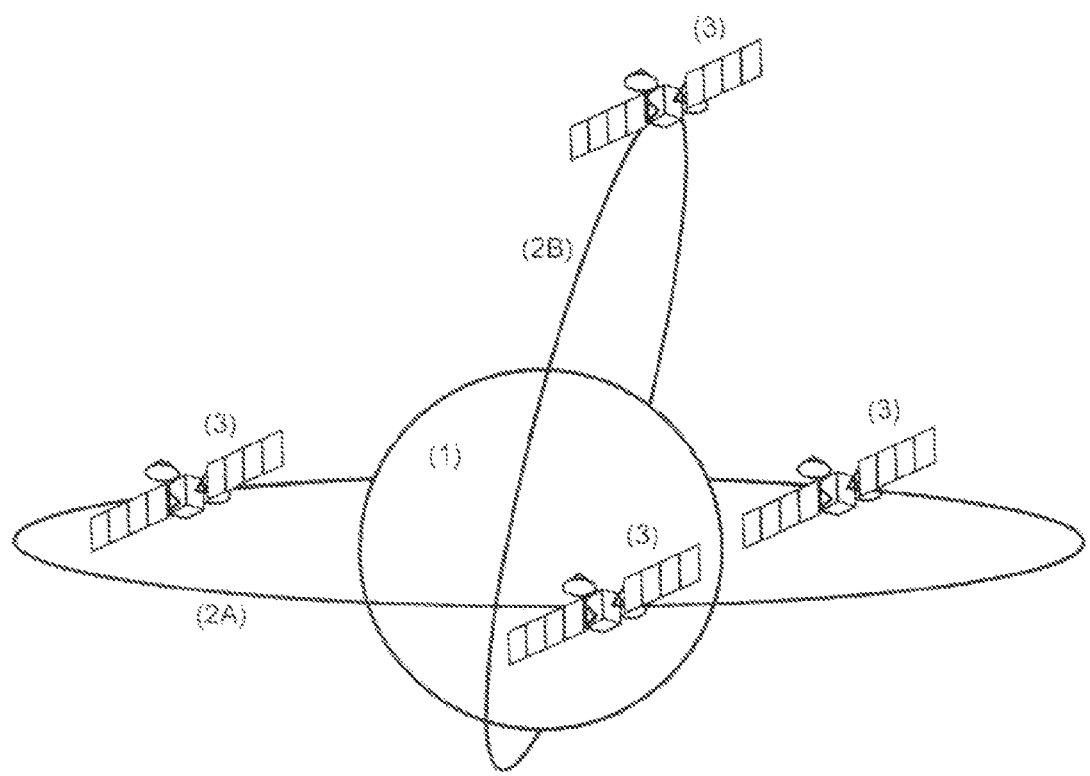
FIG. 1 is an illustration of a non-geostationary satellite constellation configuration, with a minimum constellation configuration having a combination of a small number of satellites, between 3 to 6, orbiting an equatorial circular orbit (2A) with an altitude between one to two times the Earth radius, and another minimum of 3 to 6 satellites on a polar or quasi-polar orbit (2B), at similar altitudes. Alternatively, a geo-stationary satellite configuration (not shown) can be launched, comprised of three geo-stationary satellites and three backs-ups.

Best Modes for Carrying Out the Invention

The ubiquitous collection and transmission of prior art avionics and navigation data from aircraft flying everywhere in the world is limited in coverage, reach and quality, and can be considered well below the desired levels of monitoring and safety that could be provided and implemented for all aircraft In service, commercial or otherwise, on a global basis. Current RF communications are still being provided using technologies that have not been significantly updated for decades, based on telecommunications systems, which are still using High Frequency (HF), and Very High Frequency (VHF) transmissions, or satellite communications with analog or low capacity in terms of data transfer rates.

Many satellite communications systems being used today for communications with aircraft, including for the transmission of Internet services, rely on frequency bands, which have not been allocated by the International Telecommunications Union (ITU) for the mobile satellite service, which would be the appropriate service and allocation for transmissions involving aircraft, which by nature are defined as mobile stations. Those frequency bands have an available bandwidth, which is narrow and is therefore insufficient for the provision of much greater data transfer rates, which could provide a greater quality and reliability of service. Those existing systems and technologies also are limited in terms of coverage, and are mostly limited to line of sight communications. Recent and repeated fatal accidents point to the need for an innovative telecommunication satellite system, dedicated to the needs of aeronautical safety.

The ITU frequency allocations for the Mobile Satellite Service (MSS) below 20 GHz have historically been available with relatively narrow bandwidths. As a result, existing satellite providers have relied on spectrum allocations in the Ku and Ka bands with allocation for the Fixed Satellite Service (FSS) and for the Broadcasting Satellite Service (BSS), in order to transmit Internet service to and from aircraft in flight. Therefore, the ITU allocations for FSS and BSS in the Ku and Ka bands have been increasingly used for MSS purposes, without regard for the ITU definitions for the appropriate specific satellite services. In contrast, the S4 telecommunications system in spectrum bands above 20 GHz is in accordance with ITU allocations for each specific satellite services. Hence, S4 wireless RF communications to and from aircraft takes place within spectrum frequency bands allocated for the Mobile Satellite Service (MSS) and Radio Navigation Satellite Service (RNSS) as well as FSS and BSS.

In addition, the transmission of In-Flight Internet (IFI) service for aircraft passengers on commercial, chartered, or private flights, rely on satellites in orbit, most of which were not designed to provide passengers with IFI satellite service Most passenger IFI services now available occur at low data rate transfer speeds whose connectivity coverage is not global, as evidenced by IFI service loss in remote areas and over oceans.

The presently claimed invention provides both services (avionics & navigation and in-flight Internet) using a cogent telecommunications network virtual platform, providing breakthrough levels of data rate transfer speed (super speed), which are highly disruptive to any existing system in operation, both for aircraft avionics and navigation performance signals and for in-flight Internet connectivity to passengers.

S4 provides a unique real-time, global, seamless, interactive virtual digital two-way satellite telecommunications network platform, specifically designed for mobile users, that supports both of those services, simultaneously, at super speeds resulting from the combination of Super High Frequency bands (SHF) and Extremely High Frequency bands (EHF) and a standard known as Remote Direct Memory Access (RDMA) technology, or other types of highly efficient modulation schemes such as Higher Order Quadrature Amplitude Modulation (QAM) schemes combined with the frequency bandwidths available in SHF and EHF, The general term S4 refers to a virtual platform that is global, seamless, real-time, interactive, and based on a telecommunications satellite network that provides all these characteristics anywhere and at any time. As a general virtual platform, S4 can provide specific applications that take advantage of such characteristics and more, such as extremely high speed data rates, low latency and a global and fully redundant monitoring and control management system.

Although this description discusses global aviation, navigation, telecommunications satellite systems, this disclosure is intended to include global maritime navigation, telecommunications satellite systems, and the like.

S4 RF Connectivity Services

S4 is designed to provide two categories of RF connectivity, simultaneously and continuously, to aircraft flying anywhere in the world and at any time with reliable quality of service at extremely high data rate transfer speeds, which far exceed those available from existing satellite systems in orbit today. As shown in FIGS. 2 to 10, the two types of S4 RF connectivity services are described below.

Seamless and global RF interactive connectivity links to transmit aircraft 4 avionics and navigation performance data via satellite 3 to earth stations. Known as authorized S4 network operations centers NOC (hereafter identified as "NOC(AOC/OCC/ATC)") 7 continuously and from anywhere in their flight paths, regardless of the availability or radar coverage. In addition, this application includes bi-directional wireless RF communications and control connectivity service links via satellite 3 between authorized S4 NOC(AOC/OCC/ATC) 7 and aircraft 4 streaming multimedia RF signals which include audio-video (a/v) of multiple views from cameras located outside and inside the aircraft 4 (cockpit, main cabin, equipment bay etc.) and seamless and global in-flight Internet services from NOC(ACC/OCC/ATC) 7 hardwired, for security, to Internet Service Providers (ISPs) 10 at anytime and anywhere in the world, and corresponding return channels from the passengers on aircraft 4 back to NOC(AOC/OCC/ATC) 7 hardwired to ISPs 10.

The authorized S4 ground NOC 7 with extensions "AOC/OCC/ATC" 7 and "ISP" 10 indicate that only the authorized S4 ground NOC 7 transmits uplink RF signals to S4 satellites 3 and/or receives downlink signals transmitted from S4 satellites 3 and interacts with the respective identified extension parties, as the S4 communications network is a closed system for security purposes.

Figure 9:
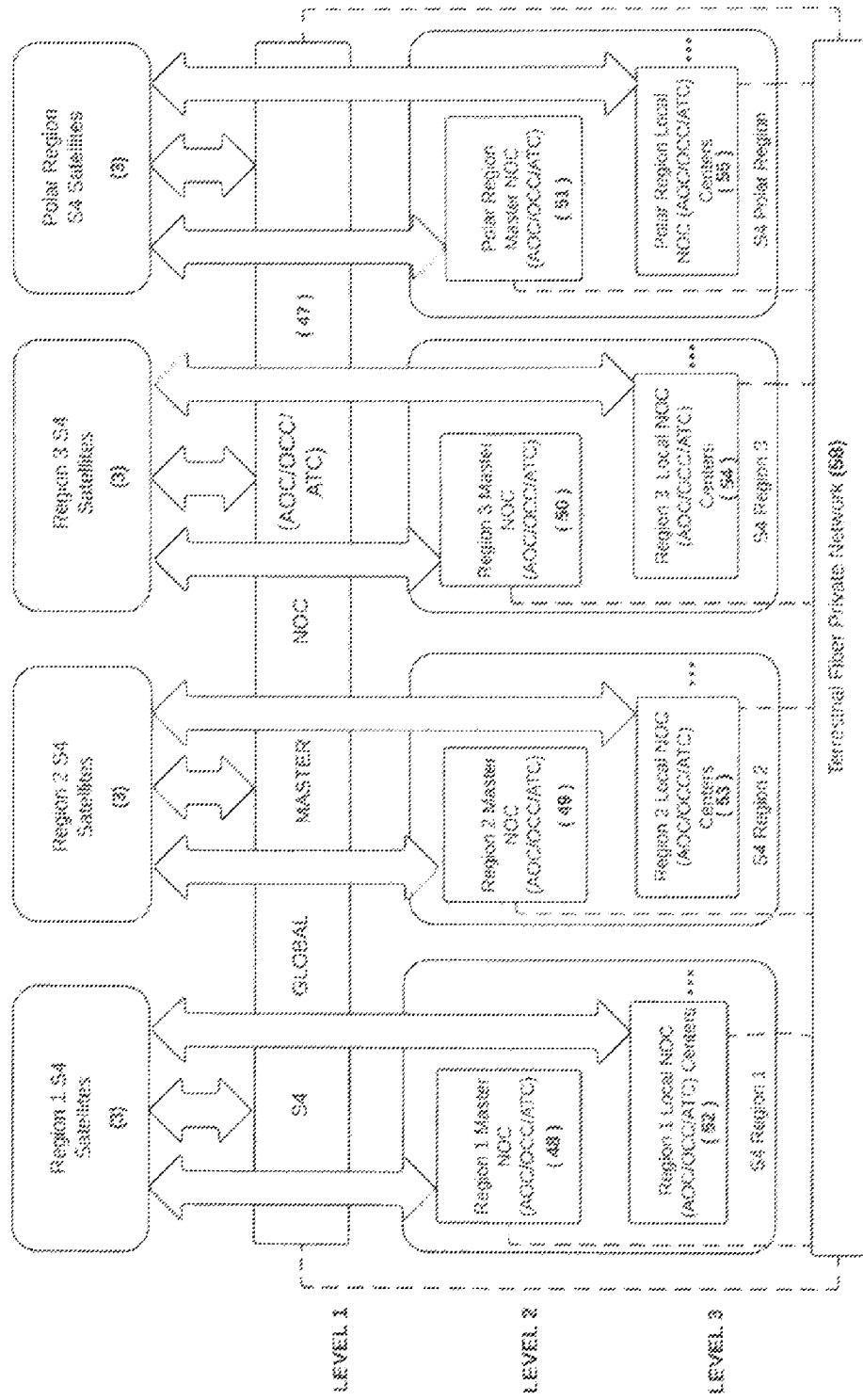
FIG. 9 is a diagram and flow chart showing the structure of S4 global master organizational chart for authorized NOCs (AOC/OCC/ATC).

This ubiquitous digital application with continuous seamless global RF connectivity has the capability to generate a real time "virtual black box", thus eliminating the need, in accidents, for costly physical searches to find the downed aircraft and recover the on-board black boxes needed to analyze and determine the accident's cause. In addition, this application can report in-flight systems anomalies to alert the need for maintenance repair. This "virtual black box" capability is illustrated in FIG. 9. Structure of S4 Global Master Organizational Chart for NOC (AOC/OCC/ATC) 7. This virtual black box is available at all Levels 1, 2, and 3 of all NOCs 7 at all times.

The bi-directional RF communication links can occur in one of two modes, routine (periodic) or non-routine (streaming). Moreover, the mode data transfer rates can be updated at specific times or continuously at super high data transfer rate speeds from anywhere in the world where aircraft 4 fly. The communications and control RF service links between NOC (AOC/OCC/ATC) 7 and the aircraft's pilot-in-command-control can shift under certain circumstances with control passed to NOC (AOC/OCC/ATC) 7 when on-board avionics and navigation systems data anomalies are declared by pilot-in-command or detected in a "data dump" or audio-video streams showing adverse on-board situations.

In the RF communication routine mode, the information between ground NOCs 7 and aircraft 4 can be programmed to occur at specific time intervals (for example, 5 seconds, 5 minutes, or 15 minutes, as defined in the filed flight plan); in the non-routine mode, all the aircraft information is transmitted continuously, whenever any avionics or navigation systems data is detected to be outside specified limits or ranges of the aircraft's airworthy flight envelope. If the non-routine streaming mode is activated, it cannot be turned-off in the flight by the aircrew. This capability also includes the bi-directional transmission of voice, data, and text between the cockpit crew and authorized NOC 7 ground control.

Naturally, the RF communication capabilities of the S4 satellite system can also be provided not only to aircraft, but also to ships navigating waters or large land vehicles (trucks and buses) anywhere in the world. For the sake of simplicity, this description will refer only to aircraft, as the preferred embodiment of the claimed invention, although the services of the S4 concept can also be provided to maritime vessels as an alternative embodiment.

Technology Concept

The S4 baseline concept is predicated on the premise of a combination of technical approaches integrated into the design of S4. The first is use of a satellite configuration with satellites orbiting a Medium Earth Orbit (MEO) or Geostationary Satellites (GEO). MEO satellites allow for a combination of a wide geographical coverage and reduced signal time delay termed "latency". For example, MEO latency is lower when compared to latency of geostationary satellites. LEO satellite latency is even lower than MEO satellite latency. However, LEOs geographical coverage is narrower and requires many more satellites to cover the earth. This is exemplified by the Iridium LEO Communications Constellation, which specifies 66 primary LEO satellites and 6 backups. A LEO configuration requires complex Spacecraft Control Center (SCC) monitoring and satellite tracking, telemetry and control (TT&C) to maintain satellites in orbit. Seamless LEO tracking of aircraft is questionable when an aircraft transitions from one LEO satellite zone of airspace coverage to the next LEO satellite zone. This requires frequent aircraft transition tracking which, in high volume aircraft traffic zones, restricts or tests the seamless limits of the LEO constellation.

The advantage of Extremely High Frequencies (EHF), above 30 GHz, is provided by a less crowed spectrum with wider frequency bands, which are allocated by the International Telecommunications Union (ITU).

MEO satellite orbit is the preferred embodiment of the claimed invention. It is preferred when latency is an issue to be minimized, as MEO satellites can bring the total latency from a signal travelling from the aircraft to the satellite relayed to the ground stations (or vice versa) from a maximum of 278 ms for a geostationary satellite, to a maximum of 74 ms for the same signal trajectory relayed through a MEO satellite. However, for applications where latency is not an issue, geostationary satellites represent an excellent alternative embodiment of the claimed invention. In addition, in some cases geostationary satellites offer additional frequency spectrum allocation, as the ITU assigns certain priority to geostationary satellites for applications claimed in this invention.

System

FIG. 1 is an illustration of a non-geostationary satellite constellation configuration, with a minimum constellation configuration having a combination of a small number of satellites, between 3 to 6, orbiting an equatorial circular orbit 2A at an altitude between one to two times the earth radius, and another minimum of 3 or 6 satellites on a polar or quasi-polar orbit 2B, at similar altitudes. With this configuration, one would not have the limitation of coverage for aircraft on flight paths over the poles, and in the highest latitudes of the earth, as the satellites orbiting on the polar or quasi-polar orbits would cover those higher latitudes above 60N and 60S.

The satellites in MEO circular equatorial orbit 2A and polar/semi-polar orbits 2B comprise S4 Satellite Non-Geostationary Constellation 3. The S4 orbital altitude between one or two times the Earth's radius of 6,371 km to 12,742 km would have maximum latencies of 74 to 120 ms (milliseconds) respectively between/among S4 authorized transmitting ground stations 7, (or hardwired to ISP 10) and aircraft 4, via said satellites 3. This order of magnitude of latency of a MEO configuration is attractive, when compared to the maximum latencies of a geostationary satellite configuration with up to 278 ms in one direction.

Figure 2:
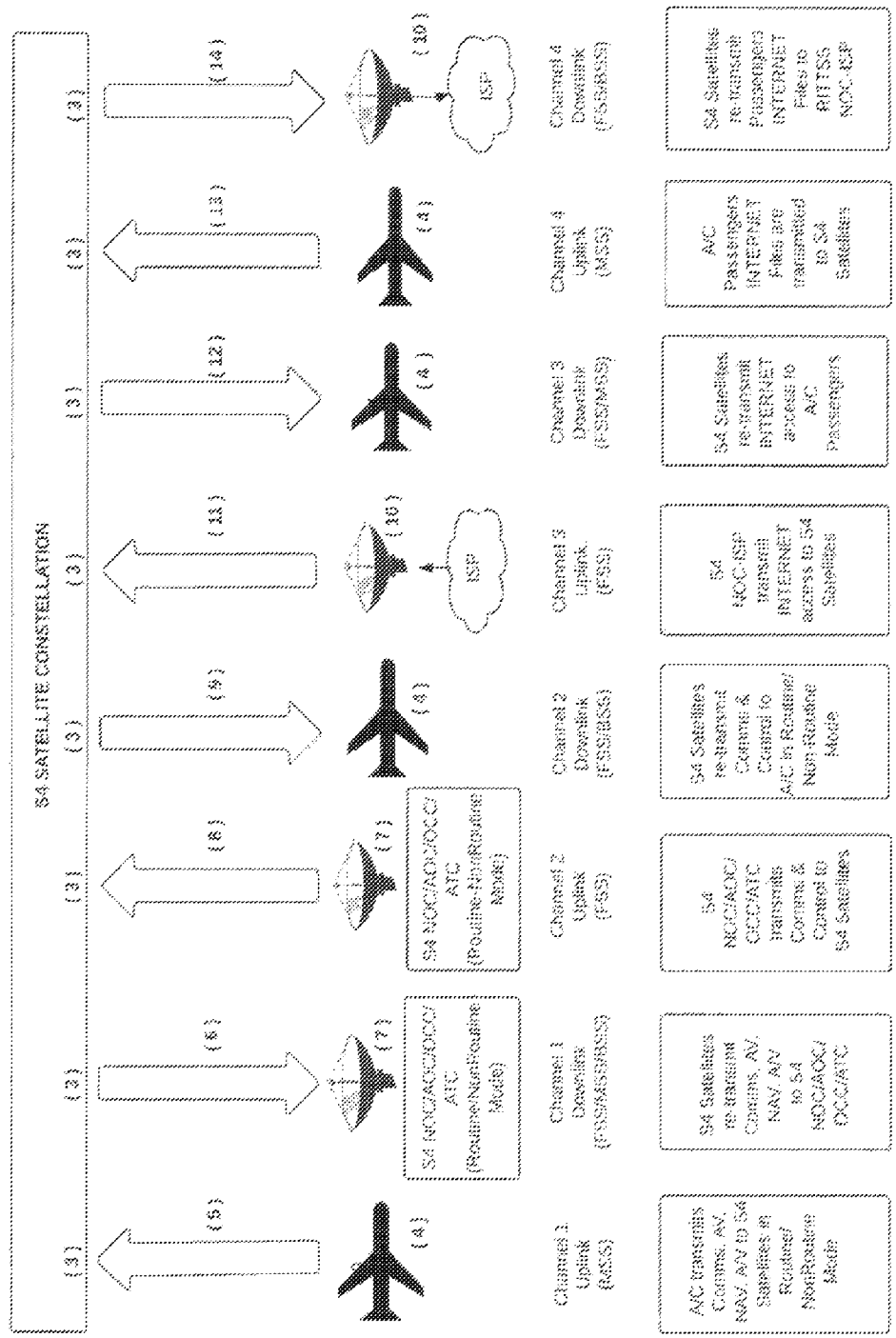
FIG. 2 is a diagram and flow chart showing the S4 Radio Communications (RC) channel connectivity with an overview of the S4 satellite system depicting four wireless RF communications channels, with their respective uplinks and downlinks.

The combined EHF and SHF frequency bands provide enough spectrum bandwidth to achieve breakthrough data speeds for the RF connectivity links to stream real time navigation and avionics (including communications, control, and multiplexed audio-video) and to provide discrete frequency channels for in-flight Internet. These are accomplished by assigning selective discrete "connectivity channels" to support each of the possible system "applications" as illustrated in FIG. 2. Each of these application channels has a discrete uplink frequency to the satellite 3, and a discrete downlink frequency from the satellite 3 to its destination. The RF uplink signal identifies the source of the RF signal transmitted to the satellite, which relays it as the RF downlink signal to its destination. The S4 RF communications system resides on a virtual cloud platform and is fully scalable. It is a redundant system to insure reliability and to insure security embodied by a closed system.

FIG. 2 illustrates the system channels. Channel 1, comprises avionics and navigation uplink from aircraft 4 to satellite 3 and respective downlink from the satellite to the S4 authorized Network Operations Centers (NOCs) connected to authorized Air Traffic Control (ATC) or authorized Operational Control Centers (AOCs or OCCs) 7.

Channel 2, comprises communications and control uplink from authorized NOC (AOC/OCC/ATC) 7 to satellite 3 and respective satellite 3 downlink to aircraft 4.

Channel 3, comprises Internet uplink from ground S4 authorized NOCs 7 hardwired to Internet Service Provider 10, to uplink Internet RF signals to satellite 3 and respective Internet RF downlink signal from satellite 3 to passengers on aircraft 4.

Channel 4, comprises Internet uplink from passengers on aircraft 4 to satellite 3 and respective downlink from the satellite to Internet authorized NOCs 7 hardwired to ISPs 10.

All RF uplink and downlink signals sent to and received from satellite 3 are routed only through S4 authorized NOCs 7 in order to maintain security.

The identified RF services and applications provide global and simultaneous, ubiquitous, real time in-flight Internet at breakthrough super speeds to passengers, in addition to RF avionics-navigation safety connectivity links between and among authorized NOCs (AOC/OCC/ATC) 7 and aircraft 4, and can be applied to water vessels and land vehicles at RF communication super speeds greater than those which are available in currently existing satellite systems and in design.

The RF communications and control application can also be applied in emergencies when an aircraft 4 is approaching the limits of stable flight and/or the aircraft lost the control of the pilot-in-command. The avionics and navigation application can provide flight data and navigation information to authorized NOCs (AOC/OCC/ATC), as well as send/receive updates about weather and other information from aircraft 4 to authorized NOCs (AOC/OCC/ATC) 7.

The avionics-navigation RF connectivity link with the communications and control channel can be programmed to transmit RF avionics-navigation data as to anomalies that vary from minimum divergences from specified limits. Or, if greater than minimum divergences are detected, aircraft 4 systems are programmed to automatically switch from the routine mode to non-routine mode to initiate continuous real time streaming of all the sensor data processed in flight data acquisition (FDAU) and transmitted to satellite 3, which is then downlinked to authorized S4 ground NOCs 7, thereby creating a real time seamless and global digital "virtual black box."

Initiation of the non-routine mode to create the real time digital "virtual black box" may indicate divergences from specified limits were in response to an inflight emergency, which may require immediate assistance from qualified ground personnel. This immediate need for assistance from qualified ground sources is not now possible, unless the aircraft pilot(s) reacts affirmatively and declares an inflight emergency. Once the non-routine streaming mode is initiated, it cannot be reset in-flight by the aircrew.

Spectrum Segmentation

Table 1 is a summary of the EHF and SHF frequency bands suitable for the uplinks of each type of RF channel described above which are selected from the Table of Frequency Allocations published in the ITU Radio Regulations (ITU-RR). This selection takes into account the applicability of respective satellite service allocations, the restrictions and availability of RF spectrum allocation in specific geographical ITU Regions (R1, R2, and R3) and consideration for global allocations, without regional or national limitations.

TABLE 1

Selected ITU Uplink Frequency Bands

| Allocated Band (GHz) | Allocated Services | Bandwidth (MHz) | Direction |
| --- | --- | --- | --- |
| 24.75-25.25 | FSS (priority Feeder Link to BSS in R2) | 500 | Ground - Satelite |
| 27.50-29.10 | FSS (priority GEO, Feeder Link for BSS) | 1,000 | Ground - Satelite |
| 29.10-29.50 | FSS (priority GEO Feeder Link to BSS & non-GEO Feeder Link to MSS) | 400 | Ground - Satelite |
| 29.50-29.90 | FSS (priority GEO, Feeder Link for BSS) | 400 | Ground - Satelite |
| 29.90-30.00 | FSS (Priority GEO & Feeder Link to BSS)-MSS | 100 | Ground - Satelite |
| 30.00-31.00 | FSS-MSS | 1,000 | Ground - Satelite Aircraft - Satelite |
| 42.50-43.50 | FSS (especially Feeder Link to SSS) | 1,000 | Ground - Satelite |
| 43.50-47.00 | MSS-RNSS | 3,500 | Aircraft - Satelite |
| 47.20-50.20 | FSS (especially Feeder Link to SSS) | 3,000 | Ground - Satelite |
| 50.40-51.40 | FSS | 1,000 | Ground - Satelite |

As such, when an aircraft flies from one Region of the ITU to another, the same frequency bands can be used continuously and seamlessly. Table 1 also shows the ITU satellite services for which each RF band is allocated, the bandwidth allocated for those services, and the direction of the RF link either as the source or the destination, from authorized ground NOCs 7, 10 or from aircraft 4 to satellite 3. A summary for each S4 RF band selected is provided below:

The RF band 24.75-25.25 GHz, with 500 MHz allocated is part of the Super High Frequency (SHF) bands of the ITU, below 30 GHz, the lower limit of the EHF bands. This band is allocated for the Fixed Satellite Service (FSS) in the earth to space direction, with priority for feeder links to Broadcasting Satellite Service (BSS) in Region 2, and with no priorities established for the other regions. This band can be used for uplinks from authorized S4 ground NOCs 7 to satellites 3, for further retransmission to aircraft 4.

The RF band 27.50-29.10 GHz with 1,600 MHz allocated with priority for geostationary satellites and feeder links for broadcasting satellite service (BSS) and for feeder links to non-geostationary satellites for Mobile Satellite Service (MSS). The band can be used for uplinks from S4 authorized ground NOCs 7 to satellites 3 for further transmission to aircraft 4.

The RF band 29.10-29.50 GHz, with 400 MHz allocated for fixed satellite service is identified by the ITU for high density applications. This band is allocated with priority for feeder links to geostationary satellites in Broadcasting Satellite Service (BSS), and feeder links to non-geostationary satellites in the Mobile Satellite Service (MSS). Uplinks from authorized S4 ground stations 7 to satellite 3, for downlink relay to aircraft 4 are an appropriate application for this band.

The RF band 29.50-29.90 GHz with 400 MHz is allocated for the fixed satellite service (FSS) with priority for geostationary satellites and for feeder links for Broadcasting Satellite Service (BSS). This band can be used for communications from authorized S4 ground stations 7.

The RF band 29.90-30.00 GHz with 100 MHz is allocated for FSS with priority for feeder links to geostationary satellites and BSS. The band is also equally allocated for the MSS. The band can be used for uplinks from authorized S4 ground stations 7 to satellites 3 and for uplinks from aircraft 4 to satellites 3.

The RF band 30.00-31.00 GHz, with 1,000 MHz available, is allocated for the FSS and for the MSS. For example, the band can be used for uplink transmissions from aircraft 4 to satellites 3 for retransmission to authorized S4 ground stations 7 and for uplinks from authorized S4 ground stations 7 to satellites 3 for retransmission to all aircraft 4.

The RF band 42.50-43.50 GHz, with 1,000 MHz available, is allocated for FSS with emphasis on feeder links for BSS, and therefore applicable for uplinks from authorized S4 ground stations 7 to aircraft 4 via satellite 3.

The RF band 43.50-47.00 GHz, with 3,500 MHZ of bandwidth, is allocated to MSS, and can be selected for the uplink from aircraft 4 to satellites 3. This band can be used for radio navigation satellite services between aircraft 4 and satellite 3. The radio navigation satellite service is defined by the ITU as "a radio determination satellite service used for the purpose of radio navigation This service may also include feeder links necessary for its own operation. The radio determination satellite service is defined as a radio communication service for the purpose of radio determination involving the use of one or more space stations".

The RF band 47.20-50.20 GHz, with 3,000 MHz available, is allocated for FSS to accommodate feeder links in the BSS, and can be used for uplinks from authorized S4 ground NOCs 7 to aircraft 4 via satellite 3.

The RF band 50.40 GHz-51.40 GHz, with 1,000 MHz available, is allocated to the FSS and can be used for transmissions from authorized S4 ground NOCs 7 to satellites 3 for further retransmission to aircraft 4.

Following the same selection criteria as mentioned above, Table 2 shows possible RF frequency bands selected for downlinks in the S4 system.

TABLE 2

Selected ITU Downlink Frequency Bands

| Allocated Band (GHz) | Allocated Services | Bandwidth (MHz) | Direction |
| --- | --- | --- | --- |
| 20.20-21.20 | FSS-MSS | 1,000 | Satelite - Ground Satelite - Aircraft |
| 37.50-39.55 | FSS | 2,000 | Satelite - Ground |
| 39.50-40.50 | FSS-MSS | 1,000 | Satelite - Ground Satelite - Aircraft |
| 40.50-42.50 | FSS-BSS | 2,000 | Satelite - Ground Satelite - Aircraft |
| 43.50-47.00 | MSS-RNSS | 3,500 | Satelite - Aircraft |

Table 2 shows the selected RF frequency bands with the corresponding ITU Satellite Services, their allocated bandwidths, any restrictions and the downlink direction to the destination of the RF communication i.e., either downlinked from satellite 3 to authorized S4 ground NOC 7 or downlinked from satellite 3 to aircraft 4.

The RF band 20.20-21.20 GHz, with 1,000 MHz available, is allocated for the fixed satellite service (FSS) and for the mobile satellite service (MSS). The FSS can be selected for downlink transmissions from satellite 3 to fixed authorized ground NOCs 7 while MSS can be selected for downlink transmissions from satellite 3 to aircraft 4.

The RF band 37.50-39.50 GHz, with 2,000 MHz available, is allocated for the FSS and can be used for downlink transmissions from satellite 3 to fixed authorized S4 ground NOCs 7.

The RF band 39.50-40.50 GHz, with 1,000 MHz available, is allocated to the FSS and MSS and can be selected for downlink transmissions from satellite 3 to aircraft 4 and from satellite 3 to authorized S4 ground stations 7.

The RF band 40.50-42.50 GHz, with 2,000 MHz available, is allocated to FSS (especially for high density applications) and BSS. Therefore, this band is fully suitable for RF transmissions from satellite 3 to aircraft 4, and transmissions from satellite 3 to authorized S4 ground NOCs 7.

The RF band 43.50-47.00 GHz, with 3,500 MHZ of bandwidth, is allocated for Mobile Satellite Service (MSS), and can be selected for the downlink from satellites 3 to aircraft 4. This band is also allocated for the radio navigation satellite service and is suitable for radio navigation applications between satellite 3 and aircraft 4.

In summary, Table 1 identifies 12,500 MHz of available RF spectrum selected for the S4 uplink channels, and Table 2 identifies 9,500 MHz of available RF spectrum selected for S4 downlink channels. However, both Tables include the same RF band 43.50-47.00 GHz, with 3,500 MHz of bandwidth, which can be apportioned between both directions (uplink and downlink); therefore, 3,250 MHz will be assigned to the downlink and 250 MHz will be assigned to the uplink in order to match the frequency bandwidth in both uplinks and downlinks. Thus, 12,750 MHz will be available in the uplink direction and 12,750 MHz will be available in the downlink direction.

The spectrum selected as described above will be assigned by S4 for each of the channel applications, which nave been discussed in the system description above. A block diagram for all channels is shown in FIG. 2, which shows the structure of the connectivity for each of the channels, with all uplinks and downlinks between Internet NOC 7 connected to ISPs 10, Avionics, and Navigation S4 authorized NOC (AOC/OCC/ATC) 7, satellites 3 and aircraft 4. The structure of that connectivity is summarized as follows:

Channel 1 Uplink 5: Avionics & Navigation data from aircraft 4 to satellite 3. This Channel also transmits signals with data which are part of the Communications & Control application;

Channel 1 Downlink 6: Avionics & Navigation data from satellite 3 to S4 authorized NOC (AOC/ACC/ATC) 7. This Channel also transmits signals with data which are part of the Communications & Control application;

Channel 2 Uplink 8: for the Communications & Control Channel from S4 authorized NOC (AOC/OCC/ATC) 7 to satellite 3;

Channel 2 Downlink 9: for the Communications & Control from satellite 3 to aircraft 4;

Channel 3 Uplink 11: for In-Flight Internet from transmitting S4 authorized Internet NOC 7 connected to ISPs 10, to satellite 3;

Channel 3 Downlink 12: for In-Flight Internet from satellite 3 to passengers in aircraft 4;

Channel 4 Uplink 13: for In-Flight Internet from passengers in aircraft 4 to satellite 3;

Channel 4 Downlink 14: for In-Flight Internet from satellite 3 to S4 authorized Internet NOC 7 connected to ISPs 10.

Description of Applications

Avionics and Navigation

Figure 3:
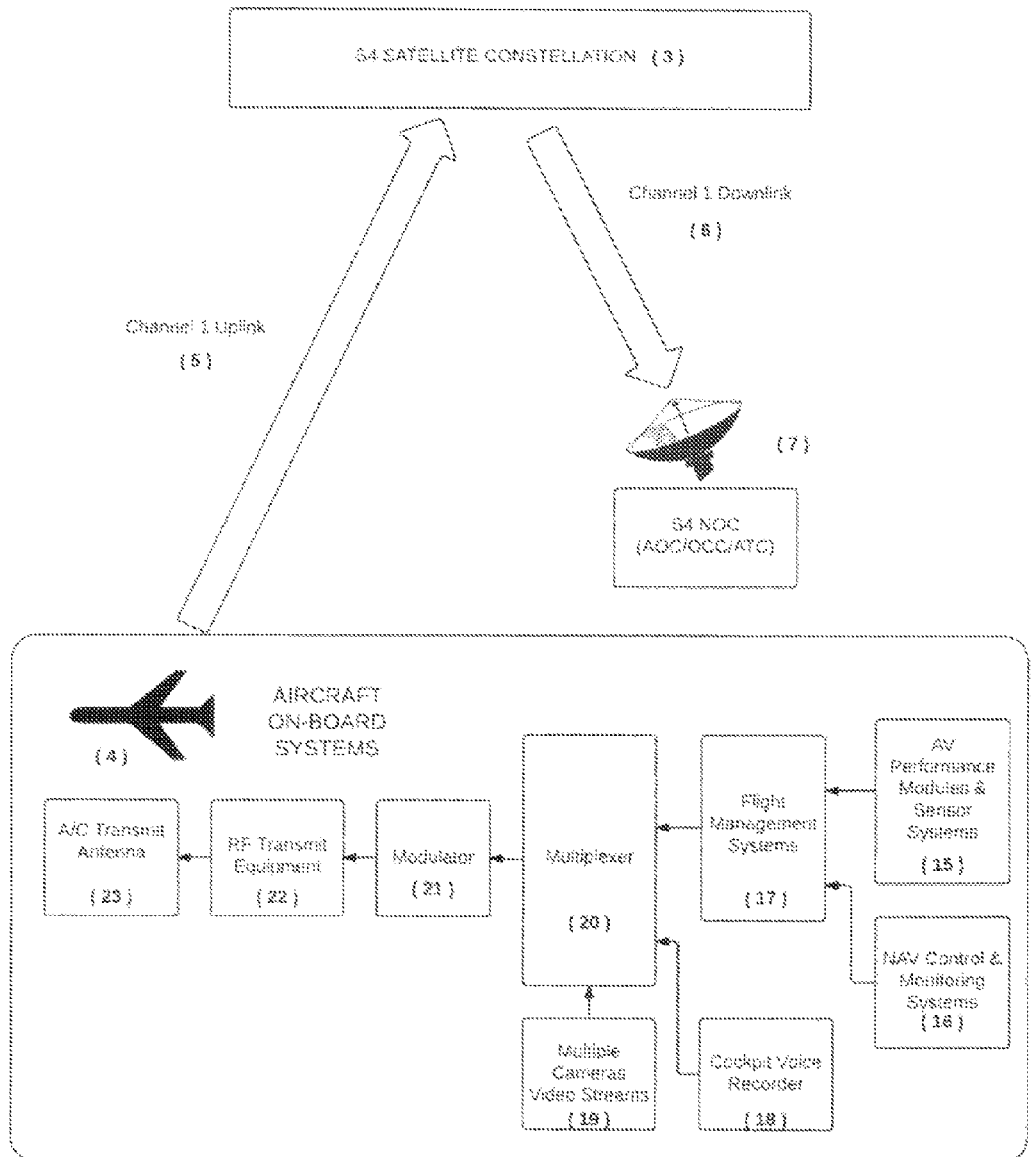
FIG. 3 is a diagram and flow chart showing the S4 aircraft on-board communications, avionics, navigation, and audio-video systems connectivity.

FIG. 3 is an overall block diagram of the Avionics and Navigation Application connectivity from aircraft 4 to satellite 3 and to S4 authorized NOC (AOC/OCC/ATC) 7. Authorized S4 NOCs 7 and authorized ground based control centers include: Airline Operating Center (AOC), Outsourced Operating Center (OOC) and Air Traffic Control (ATC). Typically, large airlines have internal operations centers and some smaller airlines have Outsourced Operating Centers (OOC) to third parties. However, both AOC and OOC roles are the same, that is, they prepare and coordinate flight plans, coordinate departure and arrival times, arrange fueling, crew, weather information, passenger manifests and manage issues that might arise during flight. Per current protocol, most messages and data to/from aircraft 4 is routed to AOC/OCCs for action rather than Air Traffic Control (ATC). ATC's role is to monitor/control ground and air traffic, clear air routing, approve en-route way points and monitor/control approaches, landing and take-off. However, to maintain security, it is the responsibility of S4 authorized ground NOCs 7 to coordinate communications with said authorized (AOC, OCC, ATC) ground stations, which appear in parentheses to signify coordination.

A/C 4 on-board communications systems sensors collect avionics 15 and navigation 16 performance data signals, which are input for processing into flight management system 17. The on-board communications systems also include audio 18 and video equipment 19 signals (a/v). Outputs from FMS 17 and a/v 18 and 19 are the input into a multiplexer 20, which combine two or more signal inputs into a common output suitable for modulation 21 and amplification into the RF transmit equipment 22 to be transmitted by A/C 4 transmit antenna 23 via Ch. 1 uplink 5 to S4 satellites 3, which then relays via Ch. 1 downlink 6 to its destination, authorized S4 ground NOCs 7, which coordinates with control centers identified in parenthesis as (AOC/OCC/ATC).

Four types of data are transmitted from the aircraft systems to the authorized control stations on the ground.

Digitized voice and data are generated at cockpit 18, including communications from aircraft 4 via satellite 3 to authorized S4 ground NOC (AOC/OCC/ATC) 7. Data from all aircraft performance modules and AV modules and sensor systems 15, including engines, which are transmitted to S4 authorized ground NOC (AOC/OCC/ATC) 7, create a seamless global real time "virtual black box". All data related to aircraft 4 route and navigation control and monitoring systems 16, including heading, velocity, latitude, longitude, attitude and altitude, and multiplexed 20 audio-video streamed from multiple cameras 19 situated where desired, for example inside the cockpit, main cabin, equipment bay, outside the cockpit, and outside the aircraft.

Multiplexed data 20 from all these signal paths will then be modulated 21, including being processed at the RDMA or QAM level, is sent to RF transmit equipment 22 in the aircraft and then transmitted by aircraft transmit antenna 23 to satellite 3 The avionics and navigation transponder in satellite 3 will retransmit these signals to S4 authorized NOCs (AOC/OCC/ATC) 7 located at each region covered by the satellites. This configuration is scalable and can be adapted to the needs of continents, countries, airline associations.

Communications and Control

Figure 4:
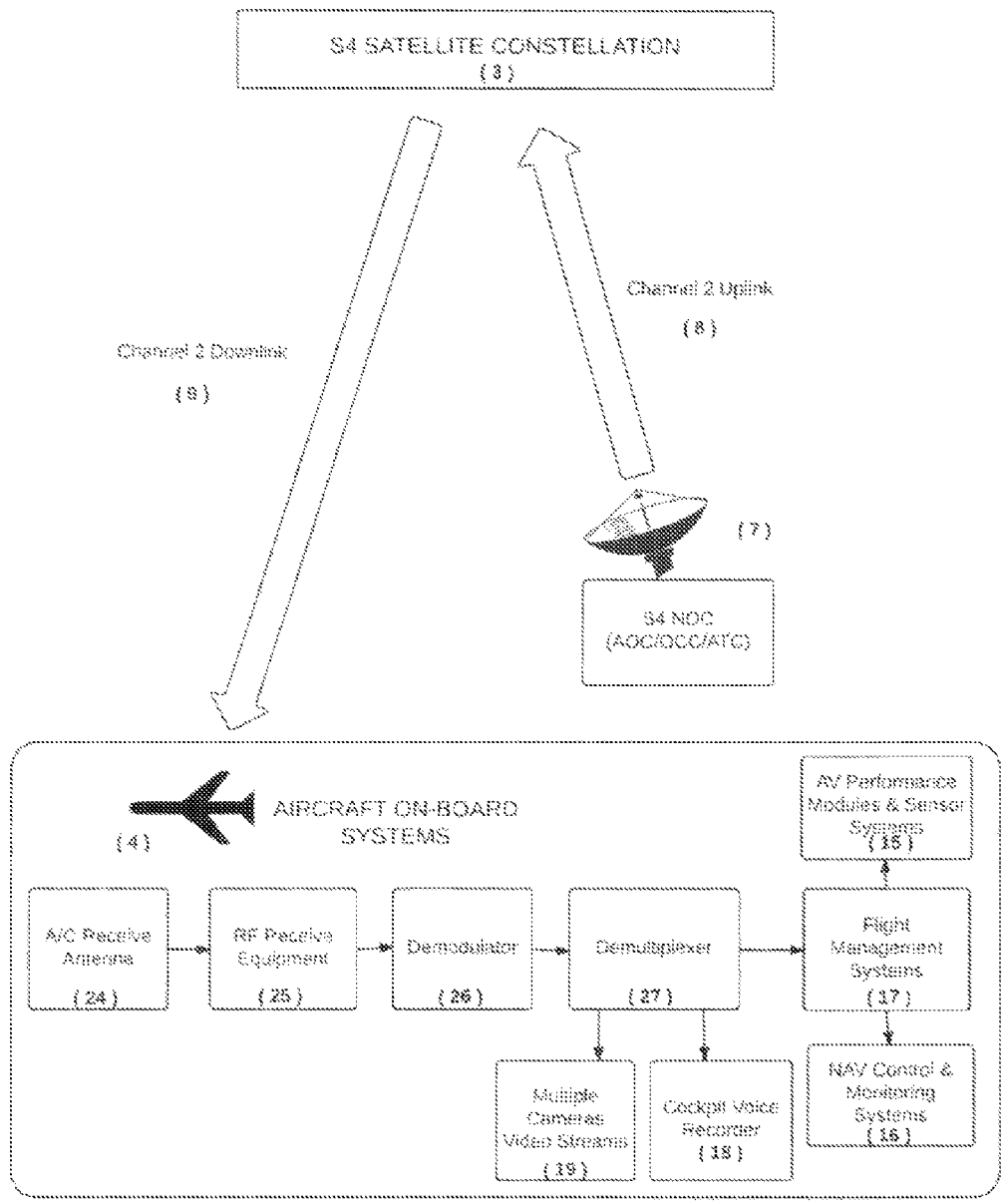
FIG. 4 is a diagram and flow chart showing the S4 communications and control connectivity.

FIG. 4 illustrates a block diagram for the Communications and Control Channel Application. The Communications and Control will transmit controller to pilot data communications between aircraft 4 and S4 authorized air traffic control centers 7. The communications and control from authorized S4 NOCs 7 updates pilot data and instructions, if needed, about aircraft 4 following filed flight plan. These connections will be provided, if required, continuously and at super high data speeds from anywhere in the world where the aircraft are flying, even in regions beyond which there is no radar coverage, such as vast bodies of water or low density population areas.

The Communications & Control includes the ability, under certain specific circumstances, to assume control of the aircraft by S4 authorized NOC (AOC/OCC/ATC) 7, when on-board safety anomalies have been detected by the avionics & navigation data and/or video streaming or when the pilot-in-command declares an emergency.

Internet from ISPs to Aircraft Passengers

Figure 5:
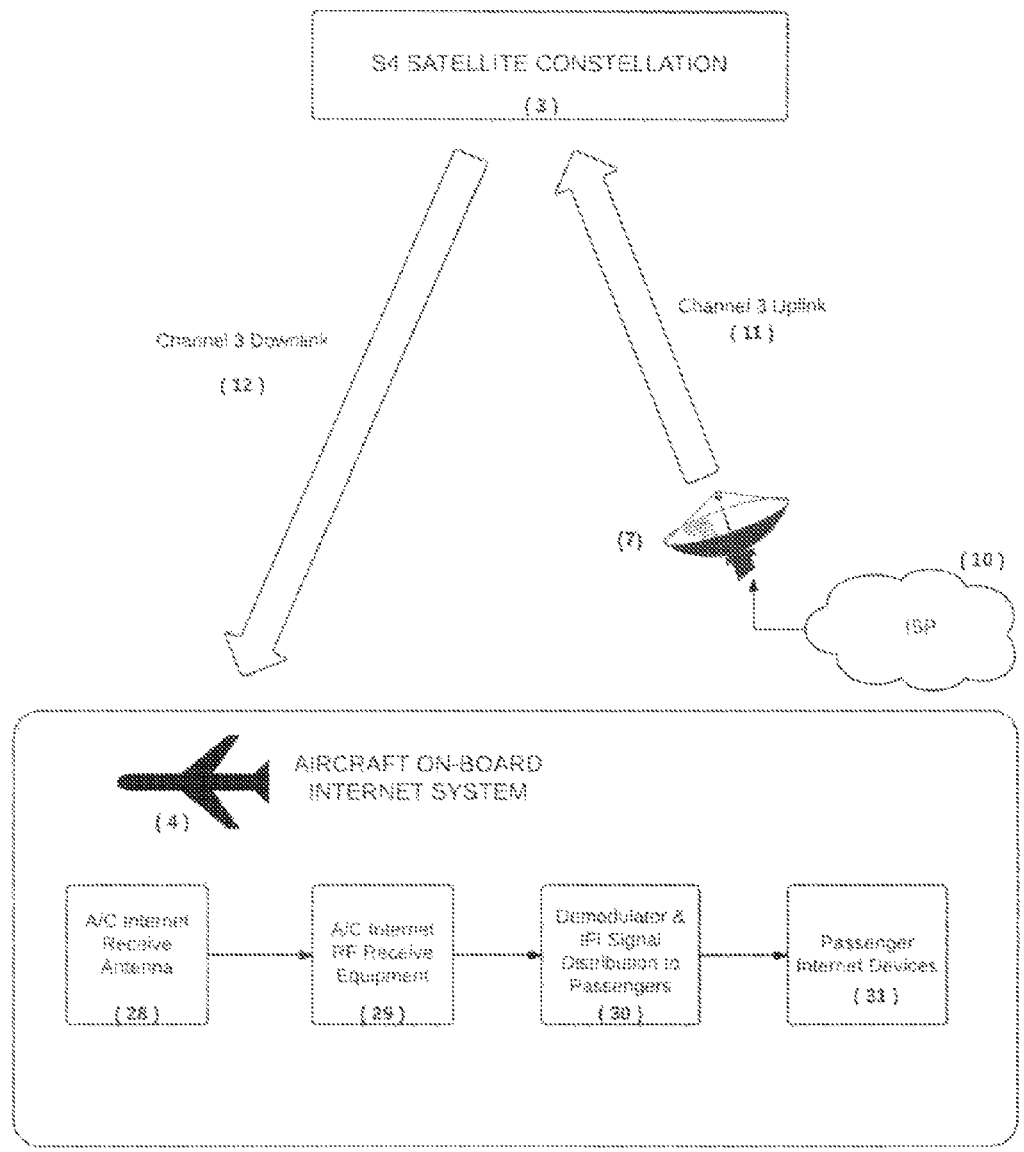
FIG. 5 is a diagram and flow chart showing the S4 Internet to A/C passenger connectivity.

FIG. 5 represents a general block diagram of the Internet ISP to passenger's connectivity application, whereby files are transmitted from the Internet to passengers on aircraft. Files downloaded from the Internet are aggregated at the S4 authorized Internet NOCs 7, which are hardwired to ISPs 10 in each Region. Those S4 authorized NOCs transmit on Internet Channel 3 uplink 11 to S4 satellites 3, which retransmit the signals on Channel 3 downlink 12 to aircraft 4. The satellite downlink covers a number of several smaller target destination areas, which together, completely cover each Region as seen from a satellite.

At aircraft 4, the signals are received at Internet receive antenna 28, and passed from RF receive equipment 29 to demodulator and distribution system 30, including RDMA or QAM processing. The baseband resulting signals are then distributed inside the aircraft, either by a wired system or by a wireless system, to passenger devices 31.

Internet from Aircraft Passengers to ISPs

Figure 6:
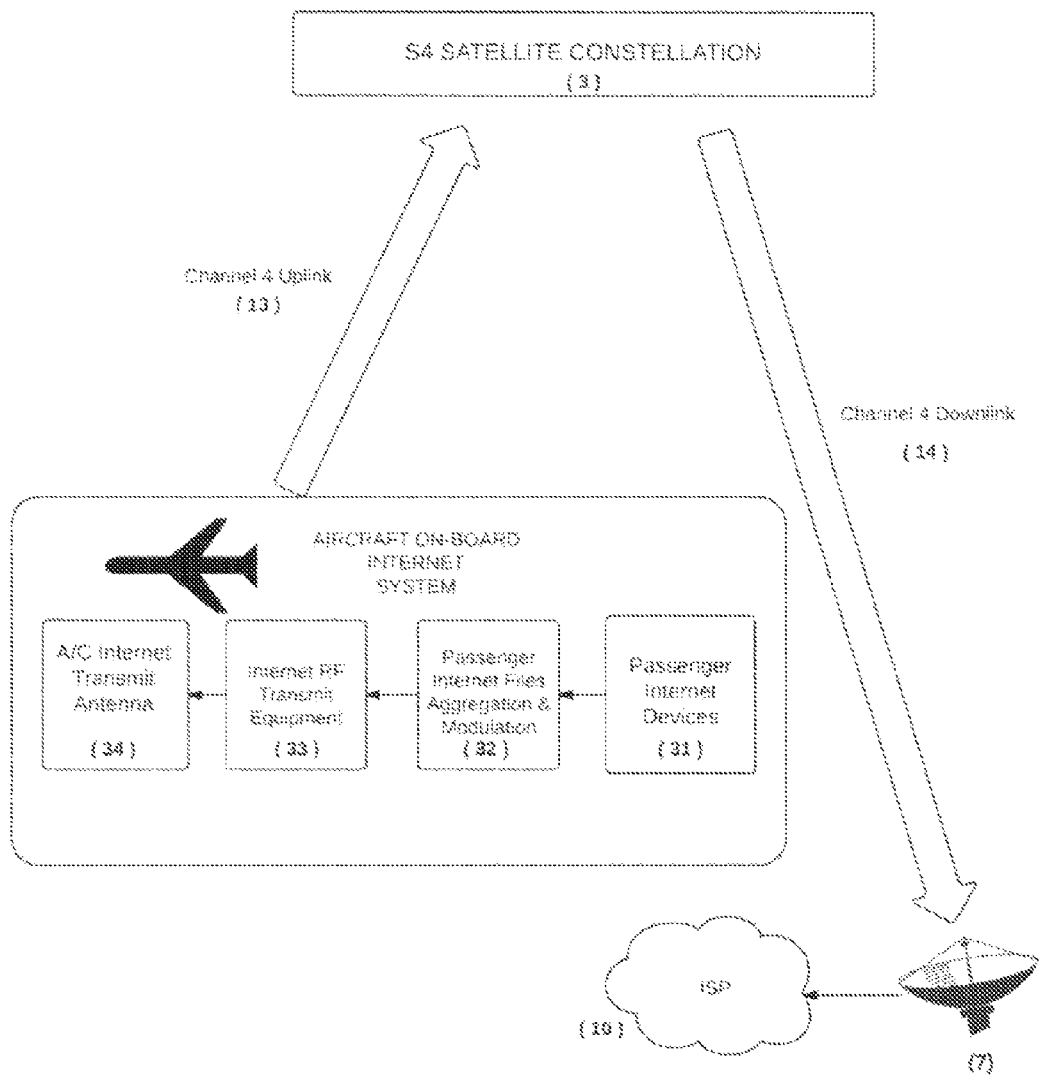
FIG. 6 is a diagram and flow chart showing the S4 A/C passengers to Internet connectivity.

FIG. 6 shows the block diagram for the connectivity of Internet transmissions from passengers on aircraft 31 to authorized NOCs hardwired to ISPs 10. From aircraft passengers with web-enabled devices inside aircraft 31, the signals are aggregated and modulated 32, and processed in RDMA or QAM, by the S4 aircraft In-Flight Internet (IFI) system. After the RF transmission equipment 33. the signals are transmitted by aircraft Internet antenna 34 on Channel 4 uplink 13 to satellite 3. Satellite 3 will retransmit those signals on Channel 4 downlink 14 to the S4 authorized Internet NOC 7, which is hardwired to ISPs 10. At each S4 authorized Internet NOC 7, the signals will be sent to ISPs 10 via a separate Internet dedicated private fiber terrestrial network 68.

S4 Components Block Diagrams

Satellite Transponders

Figure 7:
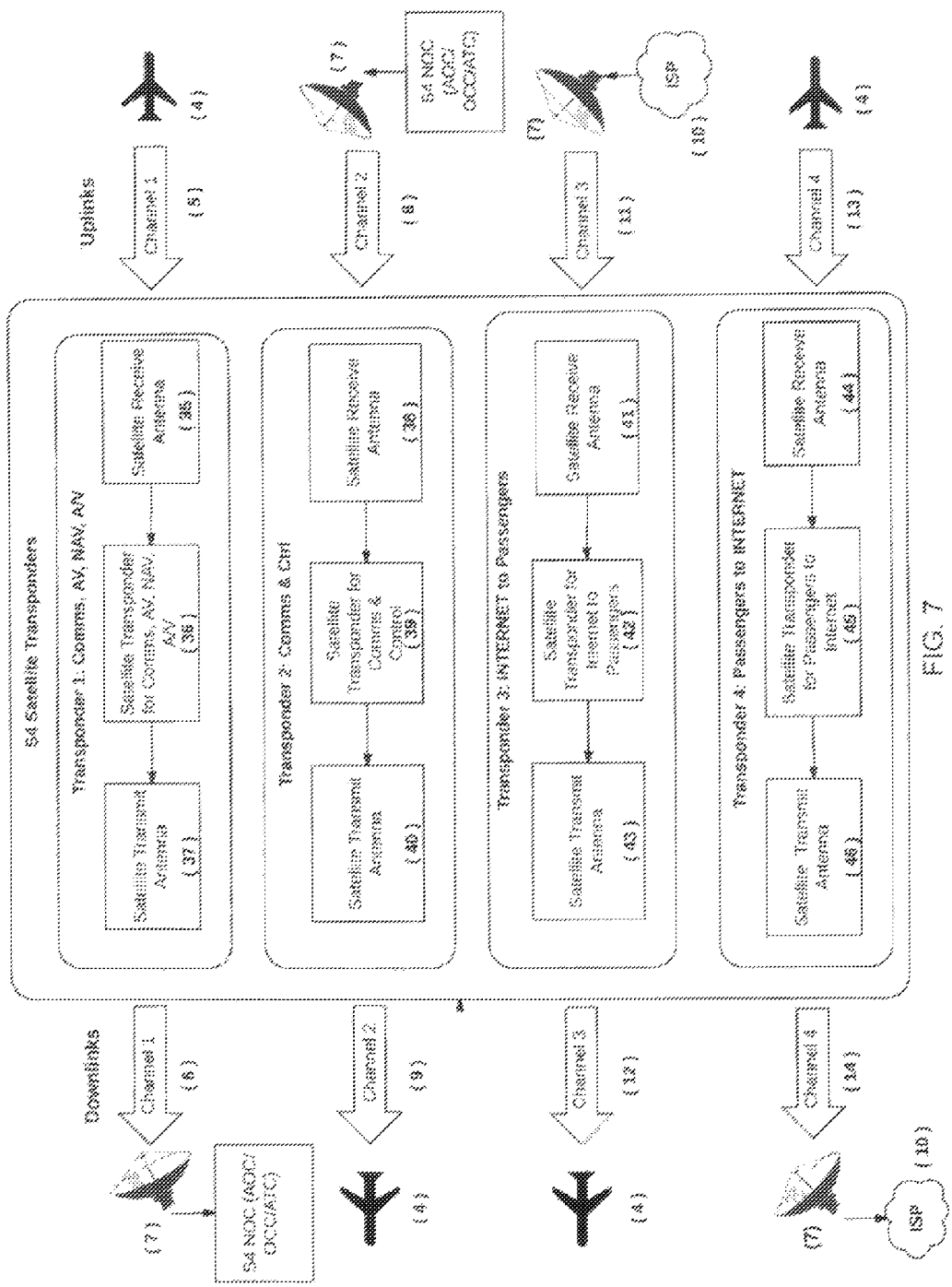
FIG. 7 is a diagram and flow chart showing the general block diagram of the S4 satellite transponders.

FIG. 7 shows a diagram of the four types of transponders that comprise the S4 satellite 3 payload. There are four transponders on each S4 satellite 3, each transponder corresponding to a specific application (spare transponders or their spare components are not shown). Each transponder type, respectively 36, 39, 42, and 45 does the processing of the channels related to each application described above.

Aircraft 4 transmits on Channel 1 uplink 5 Aviation & Navigation signals to satellite receive antenna 35, which sends Communications, A/V, NAV and a/v signals to transponder 36 for processing, and for retransmission via satellite transmit antenna 37 on Channel 1 downlink 6 to S4 authorized NOCs (AOC/OCC/ATC) 7. S4 authorized NOCs (AOC/OCC/ATC) 7 will be located in several places in the specific region to better serve the airlines utilizing the avionics and navigation information. This configuration will be discussed further below.

S4 authorized NOC (AOC/OCC/ATC) 7 will uplink Communications and Control signals to satellite 3, which will be received by the Satellite Receive Antenna 38, then sent to transponder 39 for processing and retransmitted via the satellite transmit antenna 40 on Channel 2 downlink 9 to aircraft 4.

S4 authorized Internet earth stations 7 (hardwired to the NOC/ISPs 10) transmits on Channel 3 uplink 11 Internet signals to satellite 3, to be received by satellite receive antenna 41, and processed by Internet to passengers transponder 42, and retransmitted via satellite transmit antenna 43 on Channel 3 downlink 12 to aircraft 4.

The aircraft 4 transmits on Channel 4 13 uplink, with files from its passengers, to satellite receive antenna 44, which will send them to passengers to Internet transponder 45 for processing; those signals will be retransmitted via satellite transmit antenna 46 on Channel 4 downlink 14 to S4 authorized Internet NOC 7, which are connected to ISPs 10 via separate dedicated Internet terrestrial fiber private network 68.

The four satellite receive antennas 35, 38, 41, and 44 and four satellite transmit antennas 37, 40, 43, and 46 may be completely separate physical antennas or may be combined into the same physical antenna(s), depending on determination to be made by the satellite antenna technology employed and the spectrum selected for operation of each of those antennas. In addition, other transponder(s) on the satellite will process the signals received from phased array and/or synthetic aperture radar antennas, to be relayed to predetermined ground facilities. This(ese) transponder(s) is(are) not shown on FIG. 7.

Aircraft On-Board Systems

Figure 8:
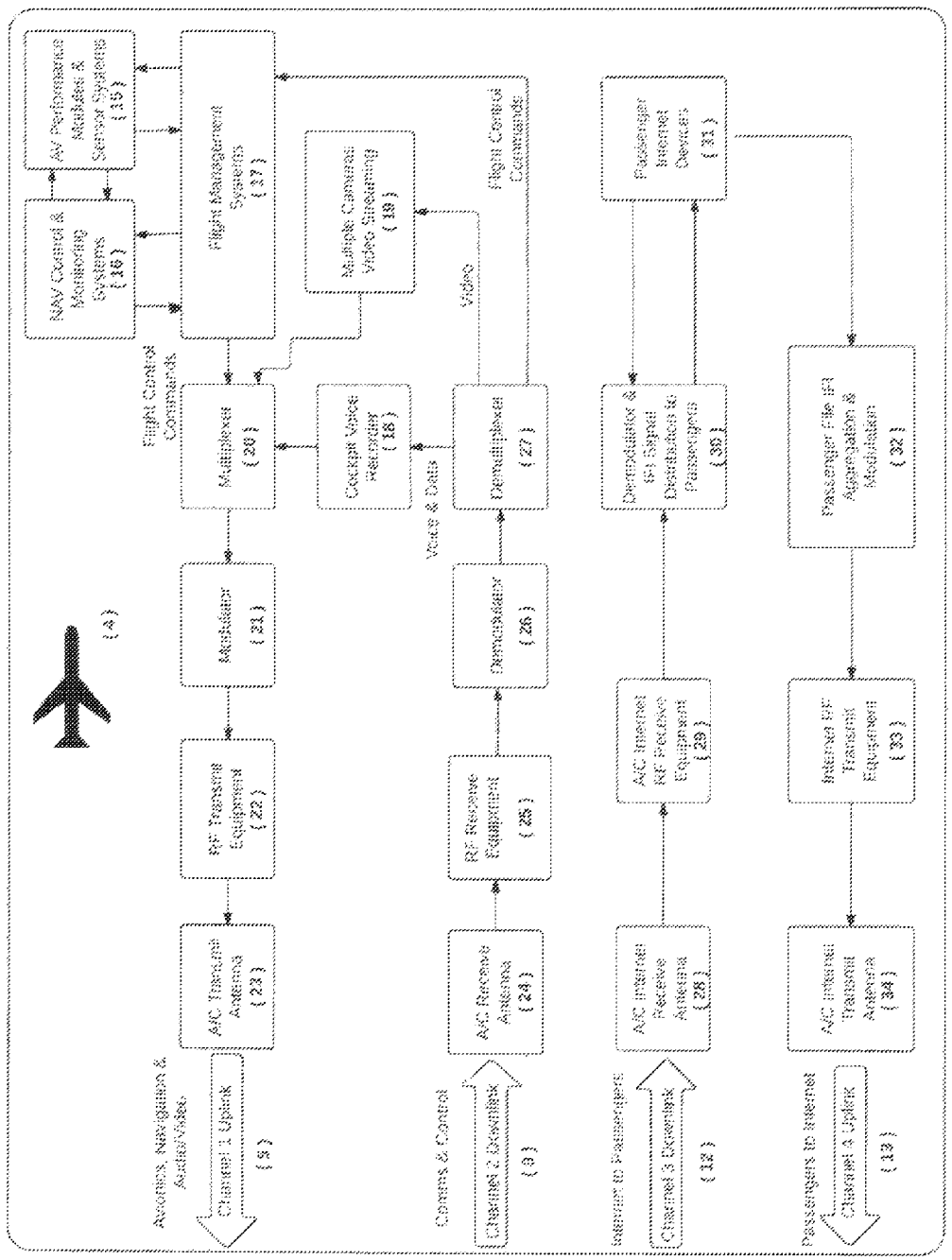
FIG. 8 is a diagram and flow chart showing the general block diagram of the S4 aircraft on-board systems.

FIG. 8 illustrates a block diagram of S4 aircraft onboard systems and modules 15 through 34, which perform all the aircraft's on-board processing to maintain safe stable flight. FIG. 8 intentionally omits the satellites 3.

AV Performance Modules & Sensor Systems Module 15 and NAV Control and Monitoring Systems Module (MSM) 16 input signals into Flight Management Systems (FMS) 17. The signals from FMS 17, cockpit voice recorder 18 and from multiple video cameras aboard aircraft 4 will be multiplexed 20, modulated 21 (including the RDMA or QAM processing), and sent to RF transmit equipment 22 for transmission through A/C transmit antenna 23 on channel 1 uplink 5 to satellite 3 (not shown).

On Channel 2 downlink 9, the Comms & Control signals transmitted from satellite 3 on channel 2 downlink 9 are received at A/C receive antenna 24, amplified and frequency converted at RF receive equipment 25, demodulated 26 and demultiplexed 27 into the signals to flight management system 17, video 19 and voice/data 18. This feature allows the command and control of the aircraft to be assumed, if necessary, by authorized S4 NOCs 7.

Internet to passenger RF signals transmitted from satellite 3 on channel 3 downlink 12 are received at A/C Internet receive antenna 28, amplified and frequency converted at A/C Internet receive equipment 29, demodulated and distributed 30 to passenger Internet devices 31 on board the A/C.

Files from passenger Internet devices 31 are aggregated and modulated 32, amplified and frequency converted at Internet RF transmit equipment 33, and transmitted through A/C Internet transmit antenna 34 to satellite 3 on channel 4 uplink 13.

Aircraft receive antennas 24, 28 receive the respective signals from the two downlinks from satellite 3 to aircraft 4: the Comms and Control signals transmitted on channel 2 downlink 9, and the respective Internet to passengers signals transmitted on channel 3 downlink 12. It is assumed that there are two separate receive antennas and two separate transmit antennas on aircraft 4. This may be necessary due to the different frequencies in which each antenna will have to operate, but a final decision on this requirement is to be taken in conjunction with the technology of aircraft on-board antennas.

Global Organizational Structure for Authorized S4 NOCs (AOC/OCC/ATC)

As shown in FIG. 9, the S4 system supports the construction of a seamless, global and scalable telecommunications and control system for air traffic operations. The S4 system architecture is designed to continuously cover four world regions in which aircraft can fly. Three of the four regions correspond to the geographical boundaries designated by the ITU, which are:

Region 1—Europe, Africa, and the Middle East, to the east of longitude 30W and to the west of longitude 90E;

Region 2—North, Central, South America, and the Caribbean, to the east of longitude 150W and to the west of longitude 30W;

Region 3—Far-East, Asia and Oceania, to the east of longitude 90E and to the west of longitude 150W.

In addition, flights over the poles will be covered under a fourth region, at latitudes above 60 degrees north and south (Polar Regions). The overall coordination of communications and control of air traffic operations on a seamless and global basis for all regions will occur as depicted at Levels 1, 2, and 3 under the global organizational structure for authorized S4 Global Master NOC(AOC/OCC/ATC) 47, at Level 1.

FIG. 9, illustrates the overall coordination of communications and control of aircraft operations on a seamless and global basis, which occurs at three Levels (1, 2 and 3). At Level 1, is the S4 Global Master NOC (AOC/OCC/ATC) 47. At each of the four regions coordination is executed at Level 2 as S4 authorized regional master NOC (AOC/OCC/ATC) 48, 49, 50, and 51; and at Level 3, as S4 authorized local NOC (AOC/OCC/ATC) 52, 53, 54, and 55, which may serve specific countries, airlines, or airline associations. As shown on FIG. 9, Level 1 global master NOC 47 provides overall coordination for Levels 2 and 3 NOCs. Level 2 regional master NOCs 48 through 51 coordinates with Levels 1 and 3 NOCs. In addition, Level 3 local NOCs 52 through 55 coordinates with Levels 1 and 2 NOCS. Levels 1, 2 and 3 NOCs all have direct access to/from uplink/downlink signals from/to satellites 3. For that feature to be possible, each center is connected directly to the satellites 3 by authorized S4 ground NOCs 7, and all regional authorized NOCs are connected to S4 authorized global master 47 and all S4 authorized master regional NOCs 48, 49, 50, and 51 are interconnected with each other, on a global basis, for redundancy purposes, by a private dedicated terrestrial fiber private network 58. In summary, all authorized S4 NOC centers, at all levels, have connections to the satellites in their regions, and all authorized S4 NOC centers, at all levels 1, 2, and 3, and are connected to each other by a terrestrial fiber private network 58. S4 innovative multiple redundancy increases both the degree of security and backup capabilities built in the system that controls all aircraft in one region, as any authorized S4 NOC is able to assist in the communications, monitoring and control of any aircraft flying in that region. In addition, since terrestrial fiber private network 58 is a dedicated private global terrestrial network, the redundancy also allows any authorized S4 NOC 7 in the world to assist with the communications, monitoring and control of any aircraft flying anywhere in the world.

In case of an emergency the Level 1 S4 authorized global master NOC (AOC/OCC/ATC) 47, Level 2 S4 authorized regional master NOCs (AOC/OCC/ATC) 48, 49, 50, and 51 and Level 3 S4 authorized regional local NOCs (AOC/OCC/ATC) 52, 53, 54, and 54 can communicate simultaneously and work together to resolve issues and take action, as required, to aid in recovery and emergency situations. All authorized S4 NOCs at Levels 1, 2, and 3 are interconnected at all times and access to any aircraft anywhere in the world through the redundant backup terrestrial fiber private network 58.

Further, the design of multiple types of redundancy capabilities discussed above, as to the innovative seamless and global structure of the authorized S4 NOCs allows any S4 authorized NOC (AOC/OCC/ATC) in any region, to assist in case of excessive atmospheric attenuation in an area where severe weather conditions limit the ability of an aircraft to communicate with its nearest S4 authorized regional local NOC (AOC/OCC/ATC). If the communication between such aircraft and the satellite is impaired by weather conditions, the S4 authorized global master NOC (AOC/OCC/ATC) 47, or S4 authorized regional master NOC (AOC/OCC/ATC) 48 to 51 can redirect the communication between that aircraft to another S4 authorized regional local NOC (AOC/OCC/ATC). Currently, no other satellite telecommunications systems now in orbit provide multiple types of redundancy, which are designed to deal with both in-flight emergencies and adverse weather conditions.

Global In-Flight Internet Network System

Figure 10:
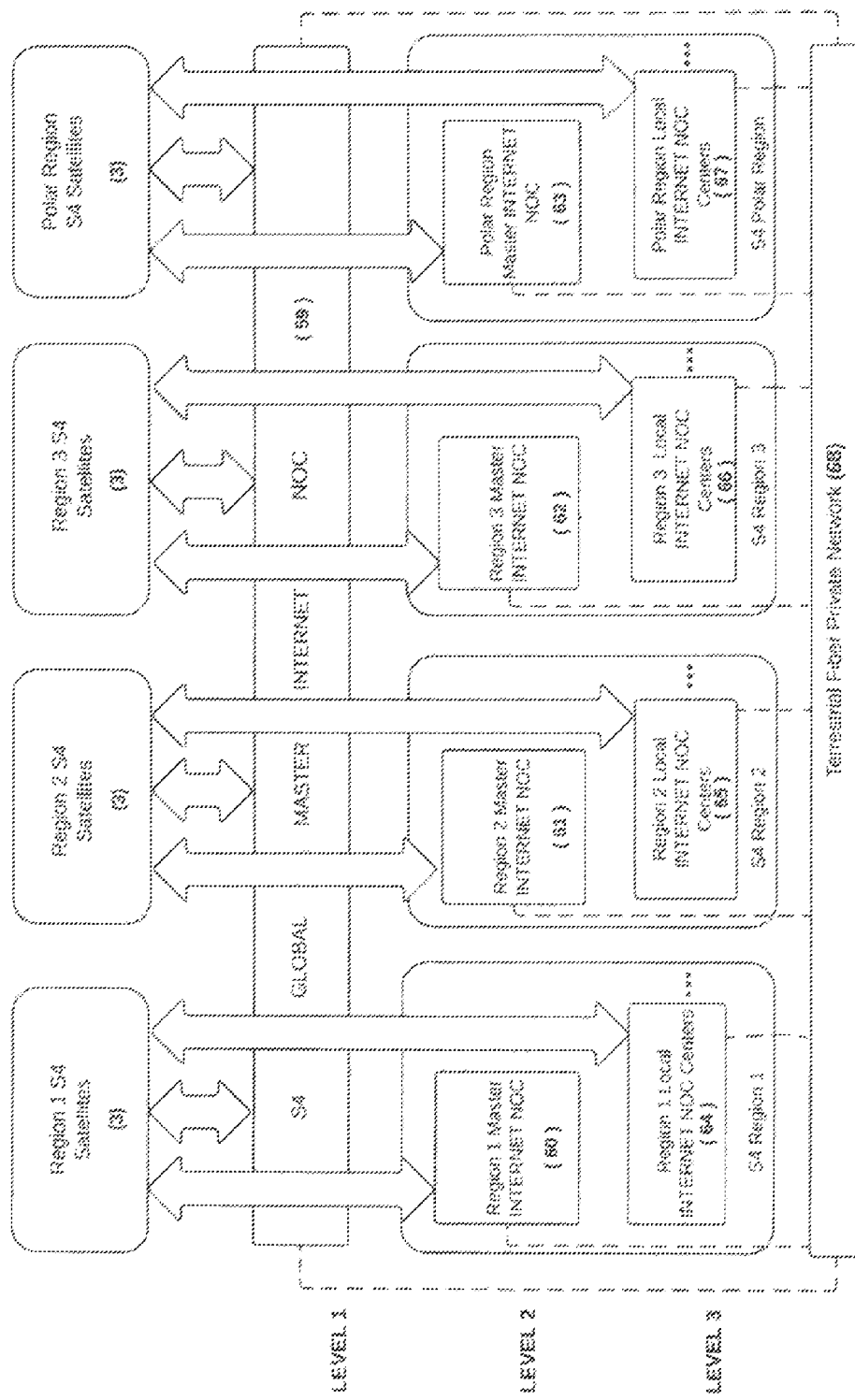
FIG. 10 is a diagram and flow chart showing the structure of the S4 global master organizational charts for Internet NOCs.

FIG. 10, despite the similarity to the structure depicted in FIG. 9, the structure illustrated in FIG. 10 for the authorized S4 Internet communication connection to and from the authorized S4 NOCs hardwired with ISPs to and from aircraft 4 for on-board passengers is physically separate, separated in spectrum and electronically isolated from the structure depicted in FIG. 9 for avionics and navigation.

The block diagram of Level 1 S4 authorized global master Internet NOC 59 network is illustrated in FIG. 10. An S4 authorized global master Internet NOC 59 coordinates the Internet traffic in all four regions at Levels 2 and 3. A number of such regional S4 NOCs are strategically located in all regions around the world. In Level 2, the master regional Internet NOCs are 60, 61, 62 and 63 and they will coordinate the Internet traffic of all S4 authorized regional local network operations NOCs 64, 65, 66, 67, and 69 located in that Region, as shown on FIG. 10.

Each of those S4 authorized NOCs 7 transmits and receives Internet signals to and from satellites 3 covering a geographic area, using the frequency bands selected. When a MEO satellite moves to a different geographic coverage area, a handover of the Internet services takes place to the satellites leaving the previous coverage area and entering the one under consideration. In an alternative embodiment, this feature is not required when a geostationary satellite is designated.

S4 authorized Internet NOCs 7 are connected to ISPs 10 and control and monitor the Internet traffic passing through the S4 system. S4 authorized Internet NOCs 7 are selected to serve the different areas of the world in the most efficient manner, to optimize the connection of Internet signals between passengers in an aircraft and the Internet. Internet NOCs 7 hardwired to ISPs 10 are connected to S4 authorized master regional Internet NOC 60, 61, 62, and 63 of each region through a terrestrial fiber private network 68 for redundancy. Each S4 authorized Internet NOC 7 receives files from the Internet ISP 10 to be transmitted to aircraft passengers, and will transmit files received from aircraft passengers, back to the Internet.

S4 Satellites Super Speed (Total Capacity)

The preferred S4 satellite configuration has a minimum of 3 MEO satellites with one MEO satellite per region, without considering back-up or spare satellites. With the need for in-orbit backup, one more MEO satellite can be scaled in each region as necessary. More satellites can be added in each region on a scalable basis, if traffic demand so requires. In addition, a minimum of three polar orbit satellites are required to cover the poles, without backup. Each of the MEO S4 satellites is able to cover approximately ⅓ of the earth's surface, and covers all flights or vessels flying or navigating in one region, visible from the satellite. In its alternative embodiment, the S4 constellation configuration has three primary geostationary satellites and three collocated backup satellites per region.

Based on innovations on the system technology of S4, the total capacity of each satellite can be estimated. The combination of EHF and SHF bands allows for a total available bandwidth of 12,750 MHz per satellite, as discussed in the section "Spectrum Segmentation".

If dual polarization is considered, the available spectrum bandwidth is 25,500 MHz. This total available bandwidth can be assumed to be subdivided into four (4) spectrum segments for frequency re-transmission, so that the total available spectrum can be re-targeted to multiple specific target destinations from each satellite. The sub-divided one-fourth of spectrum bandwidth of 6,375 MHz is available for each of the multiple target destinations from the respective satellite monitoring aircraft flying through its area of visibility.

To those skilled in the art, it is estimated that a spectral efficiency of 4-8 bits/s/Hz can be achieved in the communications channel, on a conservative basis. S4 assumes a spectral efficiency of 5 bits/s/Hz. Such spectral efficiency can be achieved through Remote Direct Memory Access (RDMA) or through Higher Order Quadrature Amplitude Modulation (QAM). At such spectral efficiency, the S4 satellites can produce a total available bit rate of 31,875 Mbps (Megabits per second) which can be focused on each of the multiple target destinations within each respective satellite area of visibility.

Current satellite antenna technology enables high-gain directional antennas to concentrate energy that precisely focus the satellite transmission signals on multiple target destinations, as "seen" by the respective satellite. S4 estimates that approximately 300 satellite target destinations will be used to monitor aircraft flying (or vessels navigating) through the airspace covered by each satellite. The resulting total high speed data transfer rate per satellite, or "S4 satellite total bit rate", is then estimated at 9,562,500 Mbps, or 9,562.5 Gbps (Gigabits per second), or 9.5625 Tbps (Terabits per second).

The data rate of approximately 9.6 Tbps per S4 satellite, together with low latency, that is a quarter of the latency of a geostationary satellite, in its preferred configuration, of a cloud based network platform to provide real time, seamless, global EHF/SHF wireless RF access and connectivity in a closed secure satellite network platform, consist the "S4 super speed". The innovative S4 satellite network platform represents a technological breakthrough for an RF communications system architecture that can replace existing communications satellite systems based on decades-old technologies. The S4 technology digital platform is a modern alternative for mobile industries that include aeronautics, maritime and land mobile transportation.

The calculation expressed above in terms of the S4 super speed formula, is as follows:

$$TSATCAP = (BWTOT \times SPECEFF \times NTDA \times 2)/SPECSEG$$

Where:
TSATCAP: is the total data rate capacity of the satellite, expressed in Mbps (Super Speed)—in the S4 example equal to 9.5 Tbps;
BWTOT: is the total bandwidth utilized by the satellite, expressed in MHz—in the S4 example equal to 12,750 MHz;
SPECEFF: is the spectral efficiency of the modulation scheme, expressed in bits/s/Hz, in the S4 example equal to 5 bits/s/Hz;
NTDA: is the number of precisely focused target destination areas transmitted by the satellite high-gain antennas, in the S4 example equal to 300 target areas; and
SPECSEG: is the number of frequency bands in which the total satellite bandwidth is segmented, in the S4 example equal to 4.

Alternative Orbital Configuration Embodiment

FIG. illustrates the S4 geostationary satellite orbital configuration, which is an alternative embodiment of the present claimed invention. The use of MEO satellite orbits is the preferred embodiment of the claimed invention. It is preferred when latency is an issue to be minimized, as MEO satellites can reduce the total latency for a signal travelling from the aircraft to the satellite and to the ground stations (or vice versa) from a maximum of 278 ms for a geostationary satellite, to a maximum of 74 ms for the same trajectory of the signal through a MEO satellite. However, for applications where latency is not an issue, the use of geostationary satellites represents an alternative embodiment of the invention. In addition, the use of geostationary satellites, when applicable, brings additional parts of the spectrum that are allocated with ITU priority accorded to geostationary satellites, as available for the applications in the claimed invention.

Figure 11:
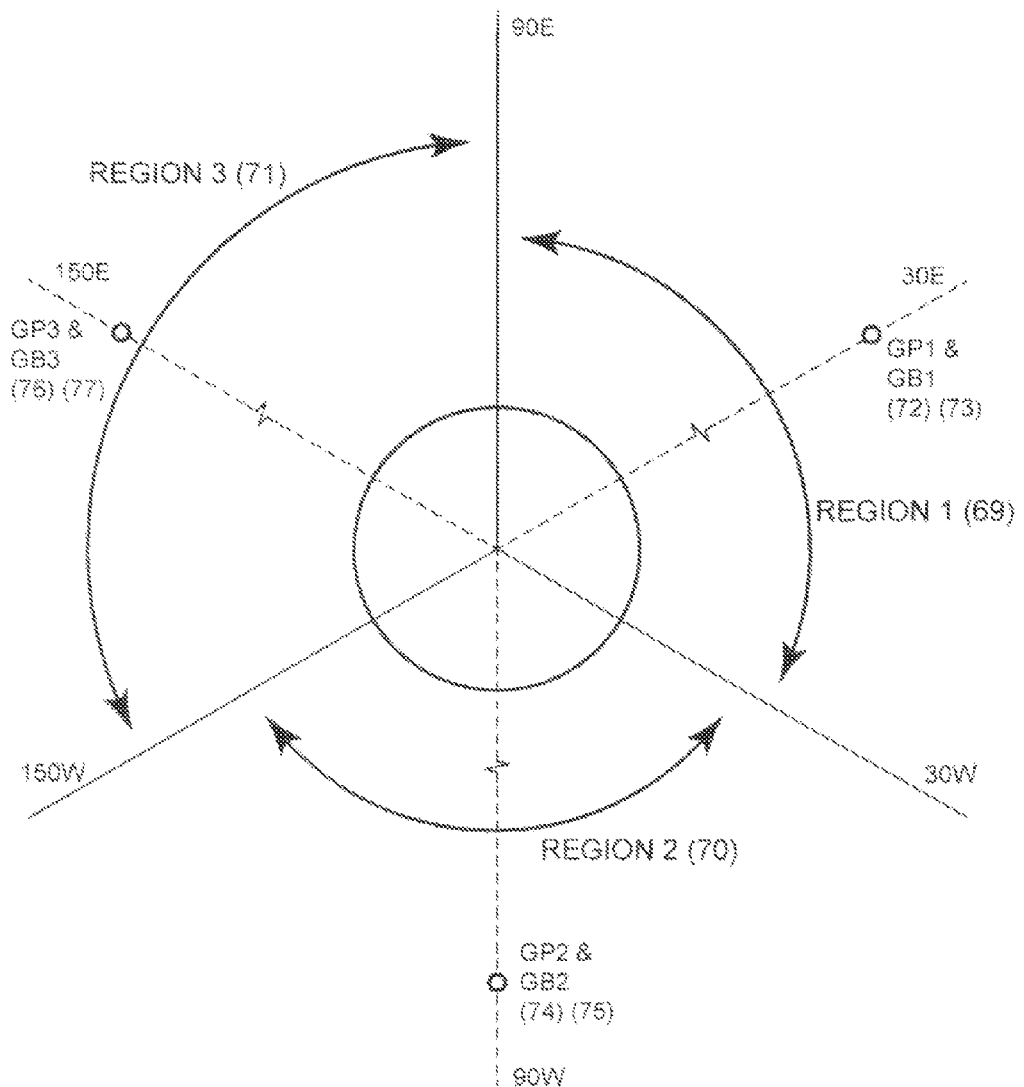
FIG. 11 is a diagram as an alternative embodiment of the S4 geostationary satellite constellation.

In the illustration of FIG. 11 (not shown in scale), the three S4 Regions follow approximately the boundaries of the three ITU geographic Regions and are defined by three Longitudes:
Region 1 69: from 30W to 90E;
Region 2 70: from 30W to 150W;
Region 3 71: from 90E to 150W.

Three primary geostationary satellites, one for each Region, will be separated by 120 degrees of longitude and placed at the center longitude of each Region (these are the ideal orbital positions, but the exact orbital positions will be determined depending on regulatory coordination), at 30E for Region 1, at 90W for Region 2 and at 150E for Region 3. Three primary satellites are designated GP1 72 (Geostationary Primary Region 1), GP2 73 (Geostationary Primary Region 2) and GP3 74 (Geostationary Primary Region 3) respectively. Three additional backup satellites, one for each Region, are collocated with the three primary satellites The backup satellites are designated GB1 75 (Geostationary Backup Region 1), GB2 76 (Geostationary Backup Region 2) and GB3 77 (Geostationary Backup Region 3) respectively. As mentioned above, the number of satellites per Region can be augmented if traffic demand so requires.

In summary, the S4 Geostationary constellation will have six geostationary satellites:

GP1 and GB1 at 30E to cover Region 1;
GP2 and GB2 at 90W to cover Region 2, and
GP3 and GB3 at 150E to cover Region 3.

Although the presently claimed invention has been described in detail with particular reference to these preferred embodiments, other embodiments can achieve similar results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A super speed multi-terabit per second global seamless satellite system comprising:
    at least one predetermined frequency band in an Extremely High Frequency (EHF) or Super High Frequency (SHF) spectrum, allocated for mobile, radio navigation and fixed satellite services, wherein the allocation comprises all International Telecommunications Union (ITU) defined Regions 1, 2 and 3;
    a predetermined modulator and signal processor to produce a spectral efficiency greater than 90% in a communications channel;
    an orbital configuration with global coverage; and
    a monitor and control architecture comprising predetermined satellites and a predetermined fiber network with access to all mobile vehicles in the super speed multi-terabit per second global seamless satellite system.

2. The super speed multi-terabit per second global seamless satellite system of claim 1 further comprising a redundant multiple path system architecture configured to mitigate effects of atmospheric attenuation and system failures.

3. The super speed multi-terabit per second global seamless satellite system of claim 1 comprising a system architecture residing on a virtual cloud platform.

4. The super speed multi-terabit per second global seamless satellite system of claim 1 comprising at least two separate satellite networks combined with redundant fiber networks.

5. The super speed multi-terabit per second global seamless satellite system of claim 1 comprising multimedia signals in one of two connectivity modes.

6. The super speed multi-terabit per second global seamless satellite system of claim 1 further comprising virtual black boxes.

7. The super speed multi-terabit per second global seamless satellite system of claim 1 further comprising authorized Network Operating Centers (NOCs) communicating with mobile vehicles utilizing Remote Direct Memory Access (RDMA).

8. The super speed multi-terabit per second global seamless satellite system of claim 1 wherein a global network supports multiple mobile connectivity applications to monitor, access, track and relay transmissions for aeronautical, maritime and land mobile applications.

9. The super speed multi-terabit per second global seamless satellite system of claim 1 comprises satellite orbits in a combination of at least two of three orbital configurations of Medium Earth Orbit (MEO), polar and geostationary satellites.

10. The super speed multi-terabit per second global seamless satellite system of claim 1 comprises integrated satellite services, security and redundancy capabilities, to address atmospheric attenuation and system failures.

11. The super speed multi-terabit per second global seamless satellite system of claim 1 comprising a phased array and Synthetic Aperture Radar (SAR) to plot virtual representations of the mobile vehicles moving through a predefined airspace.

12. A method of communicating via a super speed multi-terabit per second global seamless satellite system, the method comprising the steps of:
    selecting at least one predetermined frequency band in an Extremely High Frequency (EHF) or Super High Frequency (SHF) spectrum, wherein the step of selecting provides more than 9,000 MHz of bandwidth, with allocations in all International Telecommunications Union (ITU) defined Regions 1, 2 and 3;
    selecting predetermined modulation and signal processing schemes composing a spectral efficiency greater than 90% in a communications channel;
    selecting a predetermined orbital configuration with global coverage; and
    providing a monitoring and control architecture using satellites and a private fiber network with access to mobile vehicles in the super speed multi-terabit per second global seamless satellite system.

13. The method of claim 12 further comprising the step of providing a multiple path redundancy to mitigate effects of atmospheric attenuation and system failures.

14. The method of claim 12 wherein the modulation and signal processing schemes comprises Remote Direct Memory Access (RDMA) and Higher Order Quadrature Amplitude Modulation (QAM).

15. The method of claim 12 further comprising the step of providing a system architecture residing on a virtual cloud platform.

16. The method of claim 12 wherein the step of selecting at least one frequency band comprises providing at least two separate satellite networks combined with redundant fiber private networks.

17. The method of claim 12 wherein the step of selecting at least one frequency band comprises providing multimedia signals in one of two connectivity modes.

18. The method of claim 12 further comprising the step of enabling virtual black boxes.

19. The method of claim 12 further comprising Network Operating Centers (NOCs) communicating with the mobile vehicles utilizing Remote Direct Memory Access (RDMA) and Higher Order Quadrature Amplitude Modulation.

20. The method of claim 12 comprising monitoring, accessing, tracking and relaying multimedia signal transmissions for aeronautical, maritime and land mobile applications.

21. The method of claim 12 further comprising the step of providing satellite orbits in a combination of at least two of three orbital configurations of Medium Earth Orbit (MEO), polar and geostationary satellites.

22. The method of claim 12 comprising the step of integrating satellite services and a fiber private network for security and redundancy capabilities to address atmospheric attenuation and system failures.

23. The method of claim 12 comprising the step of providing a phased array and Synthetic Aperture Radar (SAR) to plot virtual representation of mobile vehicles moving through a pre-defined airspace.

* * * * *